(12) United States Patent
Kim et al.

(10) Patent No.: US 12,177,317 B2
(45) Date of Patent: Dec. 24, 2024

(54) EFFICIENT PROCESSING METHOD ACCORDING TO RELOCATION OF APPLICATION SERVER IN 5G

(71) Applicant: LG Electronics Inc., Seoul (KR)

(72) Inventors: Hyunsook Kim, Seoul (KR); Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 276 days.

(21) Appl. No.: 17/634,869

(22) PCT Filed: Feb. 3, 2020

(86) PCT No.: PCT/KR2020/001554
§ 371 (c)(1),
(2) Date: Feb. 11, 2022

(87) PCT Pub. No.: WO2021/033857
PCT Pub. Date: Feb. 25, 2021

(65) Prior Publication Data
US 2022/0272175 A1    Aug. 25, 2022

(30) Foreign Application Priority Data

Aug. 22, 2019  (KR) .................. 10-2019-0103216
Sep. 25, 2019  (KR) .................. 10-2019-0118038

(51) Int. Cl.
*H04L 67/563*    (2022.01)
*H04L 41/0668*   (2022.01)
(Continued)

(52) U.S. Cl.
CPC .......... *H04L 67/63* (2022.05); *H04L 41/0668* (2013.01); *H04L 65/1066* (2013.01);
(Continued)

(58) Field of Classification Search
CPC ...... H04L 67/563; H04L 67/148; H04L 67/63
See application file for complete search history.

(56) References Cited

U.S. PATENT DOCUMENTS

2015/0373198 A1* 12/2015 Ruetschi ............... H04M 3/543
                                                        379/211.01
2021/0099526 A1*  4/2021 Lee ....................... H04L 67/143
(Continued)

FOREIGN PATENT DOCUMENTS

CN    108934007      12/2018
KR    20190018691    2/2019
(Continued)

OTHER PUBLICATIONS

Huawei & HiSilicon, "AF influence for traffic forwarding in 5GLAN," S2-1906567 (revision of S2-1905750), Change Request, Presented at 3GPP TSG-SA WG2 Meeting #133, Reno, NV, USA, May 13-17, 2019, 8 pages.

*Primary Examiner* — Jason D Recek
(74) *Attorney, Agent, or Firm* — Fish & Richardson P.C.

(57) ABSTRACT

According to the present specification, disclosed is a method for preventing the transmission of a negative response when an AF subscribed to a notification service for a user plane management event receives a notification from an SMF, and when it is determined that a subsequent action according to the notification cannot be processed immediately but can be processed after a predetermined period of time.

1 Claim, 31 Drawing Sheets

(51) Int. Cl.
    *H04L 65/1066*    (2022.01)
    *H04L 65/40*       (2022.01)
    *H04L 67/148*     (2022.01)
    *H04L 67/63*       (2022.01)

(52) U.S. Cl.
    CPC ............ *H04L 65/40* (2013.01); *H04L 67/148* (2013.01); *H04L 67/563* (2022.05)

(56) References Cited

U.S. PATENT DOCUMENTS

2022/0109633 A1*   4/2022   Li ........................... H04L 61/58
2022/0191100 A1*   6/2022   Kim .................... H04L 61/4511

FOREIGN PATENT DOCUMENTS

| KR | 20190060667 | 6/2019 |
| KR | 20190097278 | 8/2019 |

\* cited by examiner

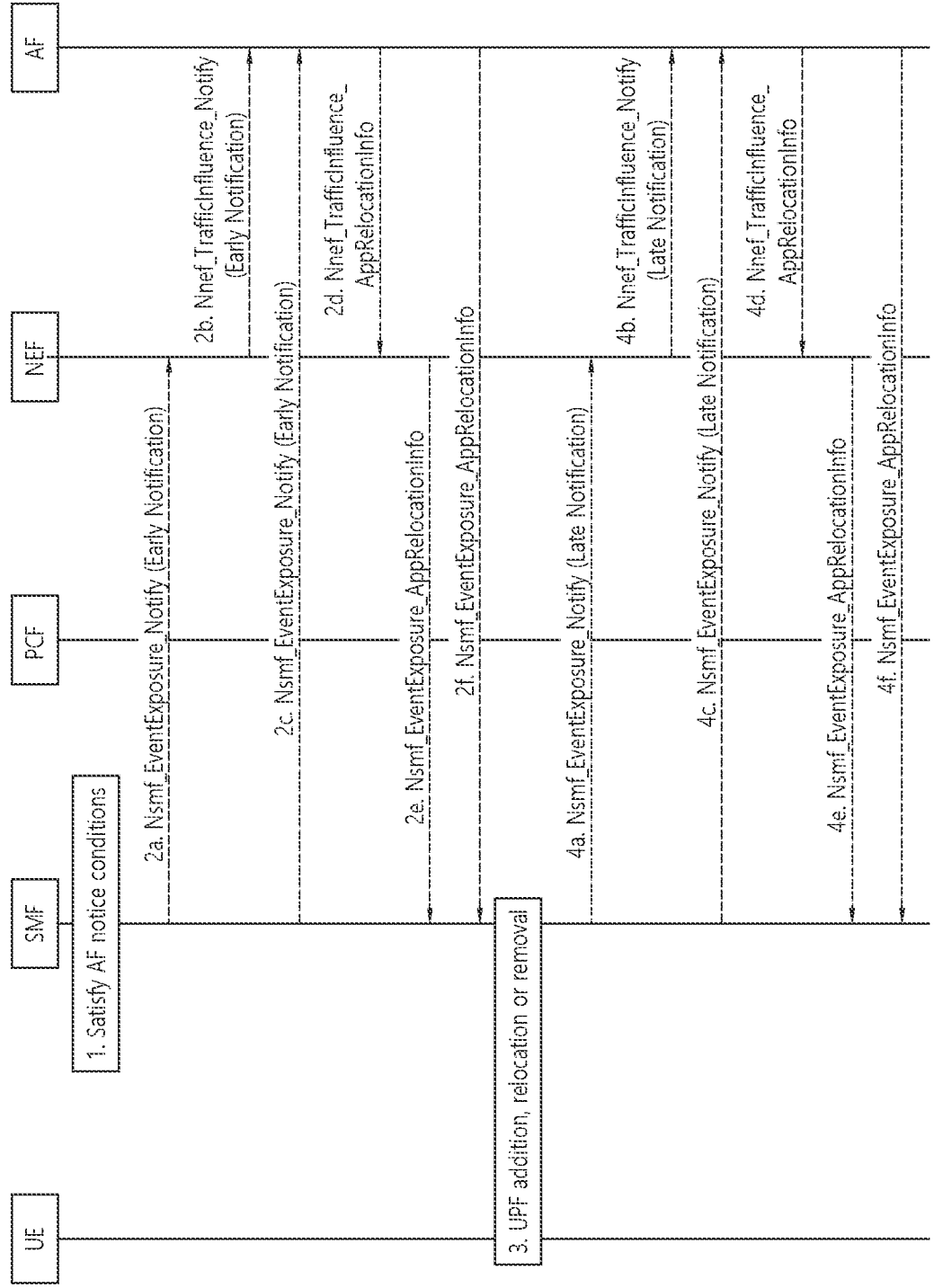

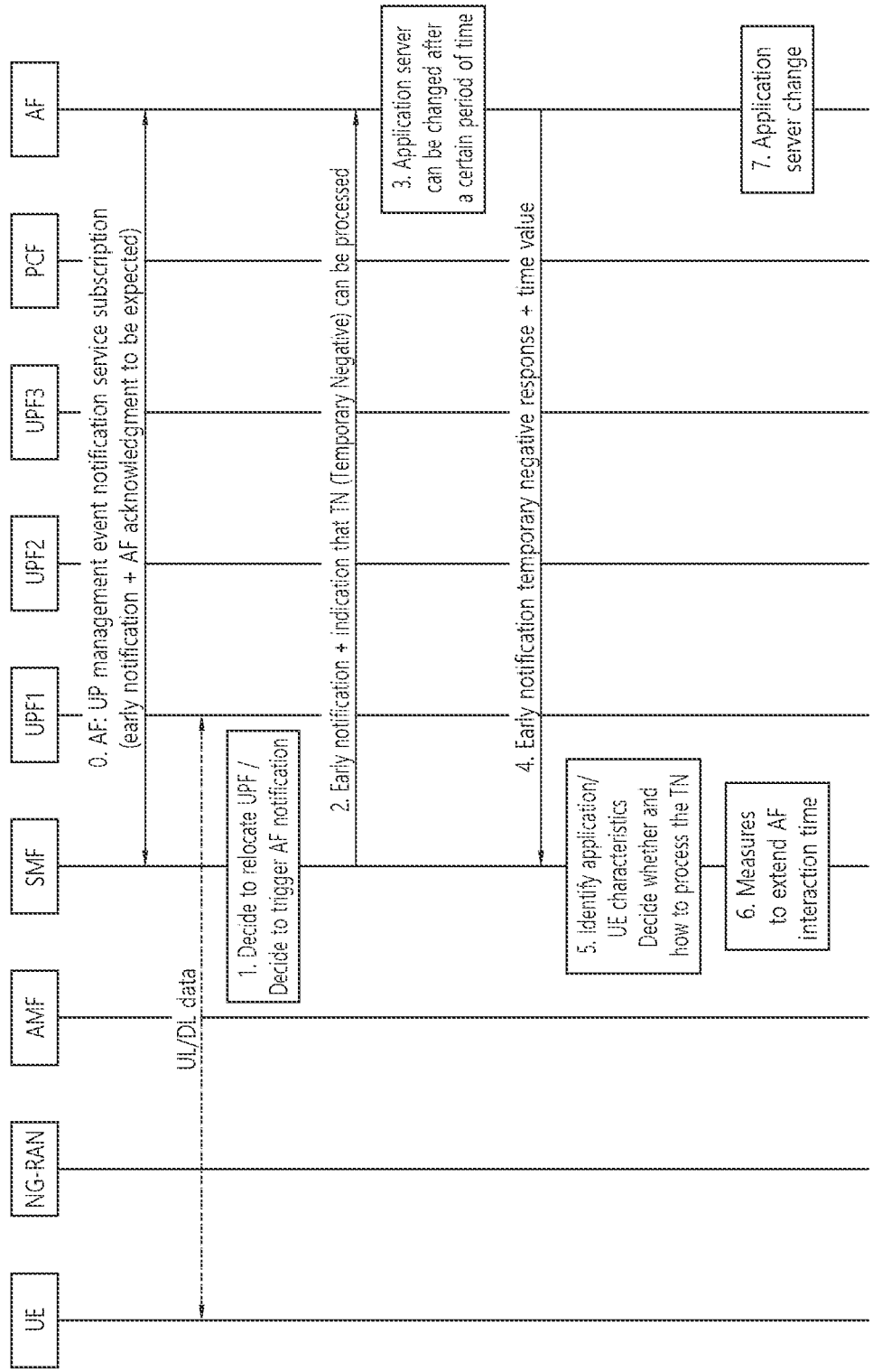

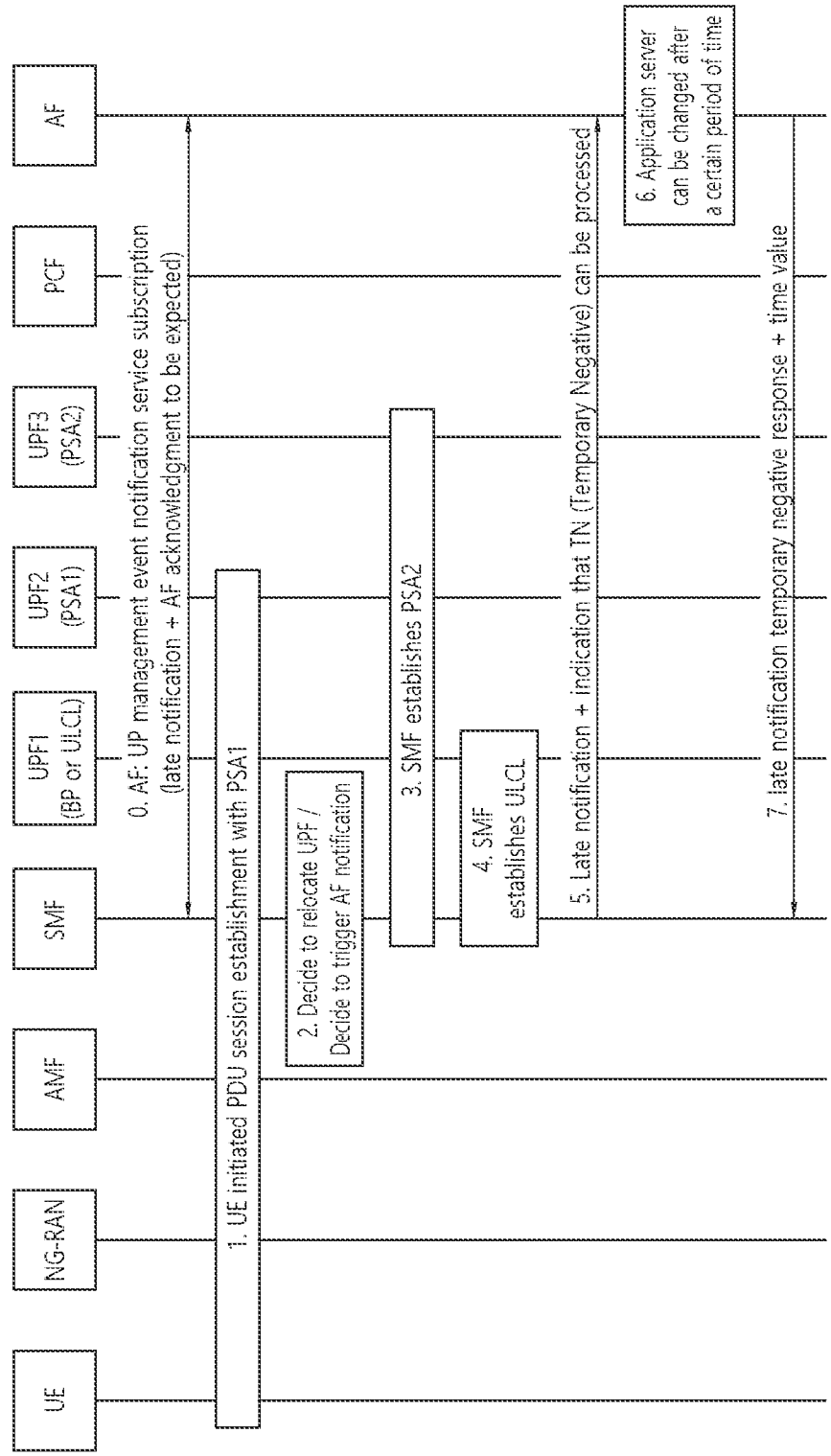

EFFICIENT PROCESSING METHOD ACCORDING TO RELOCATION OF APPLICATION SERVER IN 5G

CROSS-REFERENCE TO RELATED APPLICATIONS

This application is a National Stage application under 35 U.S.C. § 371 of International Application No. PCT/KR2020/001554, filed on Feb. 3, 2020, which claims the benefit of Korean Patent Application No. 10-2019-0103216, filed on Aug. 22, 2019 and Korean Patent Application No. 10-2019-0118038, filed on Sep. 25, 2019. The disclosures of the prior applications are incorporated by reference in their entirety.

TECHNICAL FIELD

The present specification relates to next-generation mobile communication.

BACKGROUND

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 1 is a structural diagram of a next-generation mobile communication network.

The 5G Core network (5GC) may include various components, part of which are shown in FIG. 1, including an Access and mobility Management Function (AMF) 410, a Session Management Function (SMF) 420, a Policy Control Function (PCF) 430, a User Plane Function (UPF) 440, an Application Function (AF) 450, a Unified Data Management (UDM) 460 and a Non-3GPP Interworking Function (N3IWF) 490.

A UE 100 is connected to a data network via the UPF 440 through a Next Generation Radio Access Network (NG-RAN).

The UE 100 may be provided with a data service even through untrusted non-3GPP access, e.g., a Wireless Local Area Network (WLAN). In order to connect the non-3GPP access to a core network, the N3IWF 490 may be deployed.

FIG. 2 is an exemplary diagram illustrating a predicted structure of a next generation mobile communication in terms of a node.

Referring to FIG. 2, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 2, a UE can simultaneously access two data networks using multiple Protocol Data Unit (PDU) sessions.

FIG. 3 is an exemplary diagram illustrating an architecture for supporting simultaneously access two data networks.

FIG. 3 illustrates an architecture that allows the UE to simultaneously access two data networks using one PDU session.

Reference points shown in FIGS. 2 and 3 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.
   NAS procedures related to AMF include the following.
   Registration management and access management procedures. AMF supports the following functions.
   Secure NAS signal connection between UE and AMF (integrity protection, encryption)
2) The NAS entity for SM performs session management between the UE and the SMF.
   The SM signaling message is processed, that is, generated and processed, at an NAS-SM layer of the UE and SMF. The contents of the SM signaling message are not interpreted by the AMF.
   In the case of SM signaling transmission,
   The NAS entity for the MM creates a NAS-MM message that derives how and where to deliver an SM signaling message through a security header representing the NAS transmission of SM signaling and additional information on a received NAS-MM.
   Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an Access Stratum (AS).

SUMMARY

Accordingly, the disclosures of the present specification aim to provide an effective operation method between a User Equipment (UE), an Application Function (AF) node, and a Session Management Function (SMF) node.

In order to achieve the above object, one disclosure of the present specification provides a device for an Application Function (AF) node. The device may include at least one processor; and at least one memory for storing instructions and operably electrically connectable to the at least one processor. The instructions, based on being executed by the at least one processor, may perform operations comprising: receiving, from a Session Management Function (SMF) node, a notification message for a User Plane (UP) related event; and based on inability to immediately process a subsequent operation according to the notification message, transmitting, to the SMF node, a message including a temporary negative response. Based on transmission of the message including the temporary negative response, a negative response may not be transmitted. The notification message may include information informing a change of a UP path.

In order to achieve the above object, one disclosure of the present specification provides a device for a Session Management Function (SMF) node. The device may include at least one processor; and at least one memory for storing instructions and operably electrically connectable to the at least one processor. The instructions, based on being executed by the at least one processor, may perform operations comprising: transmitting, to an Application Function (AF) node, a notification message for a User Plane (UP) related event; and receiving, from the AF node, a message including a temporary negative response. The temporary negative response may be received based on inability for the AF node to immediately process a subsequent operation according to the notification message. Based on transmission of the message including the temporary negative response, a negative response may not be transmitted. The notification message may include information informing a change of a UP path.

In order to achieve the above object, one disclosure of the present specification provides a device for a User Equipment (UE). The device may include at least one processor; and at least one memory for storing instructions and operably electrically connectable to the at least one processor. The instructions, based on being executed by the at least one processor, may perform operations comprising: receiving, from a Session Management Function (SMF) node, a message including information informing that change of an application server has occurred or is expected to occur; based on reception of the message, driving a timer for a remaining time until the change of the application server; and updating a Protocol Data Unit (PDU) session to an active state upon expiry of the timer.

According to the disclosure of the present specification, when a situation such as relocation of an application server in the network occurs, a synchronization process between 5GC and AF can be performed more efficiently. Through this, edge computing can be implemented, and a user experience can be increased.

BRIEF DESCRIPTION OF THE DRAWINGS

FIG. 7 shows a procedure for notification of a user plane management event.

FIGS. 12a and 12b show another modified example of the first implementation example shown in FIG. 10.

FIGS. 15a and 15b show an example for transmitting a late notification in a UL CL procedure according to a fourth implementation example.

DETAILED DESCRIPTION

Figure 1:
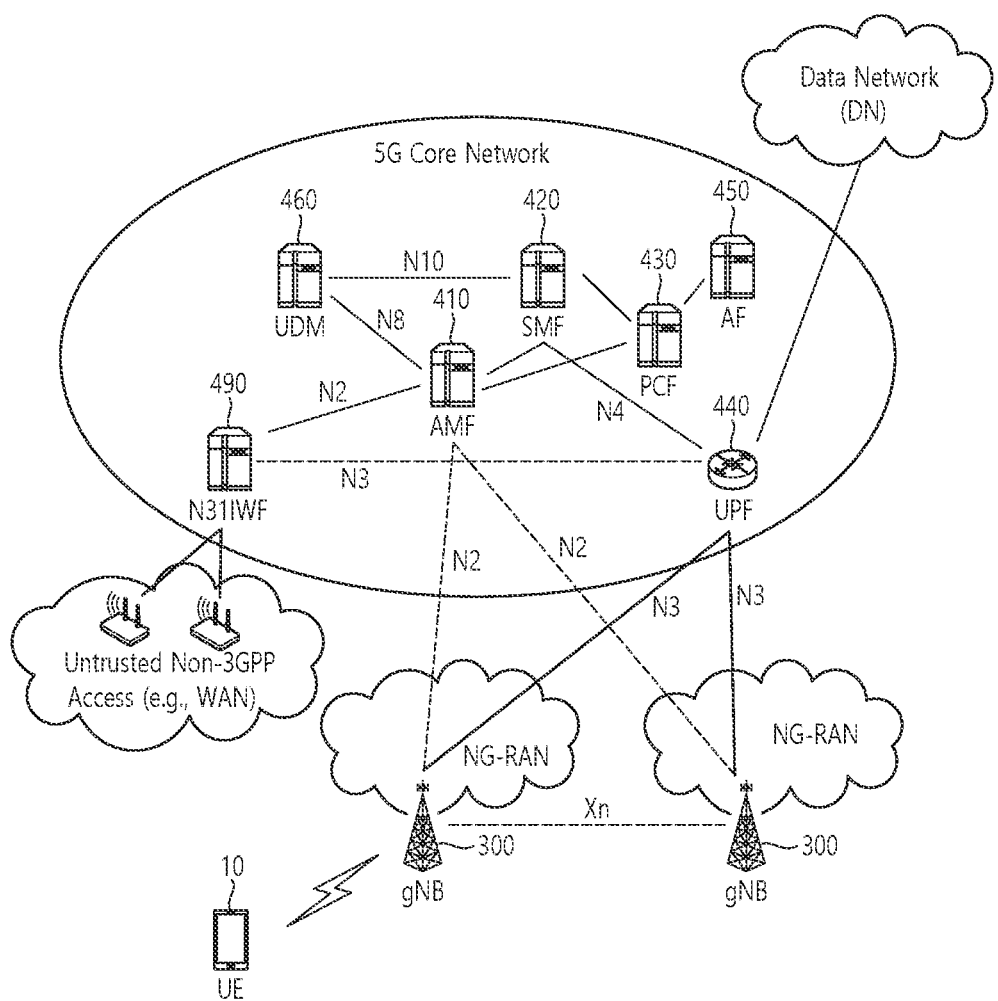
FIG. 1 is a structural diagram of a next-generation mobile communication network.
Figure 2:
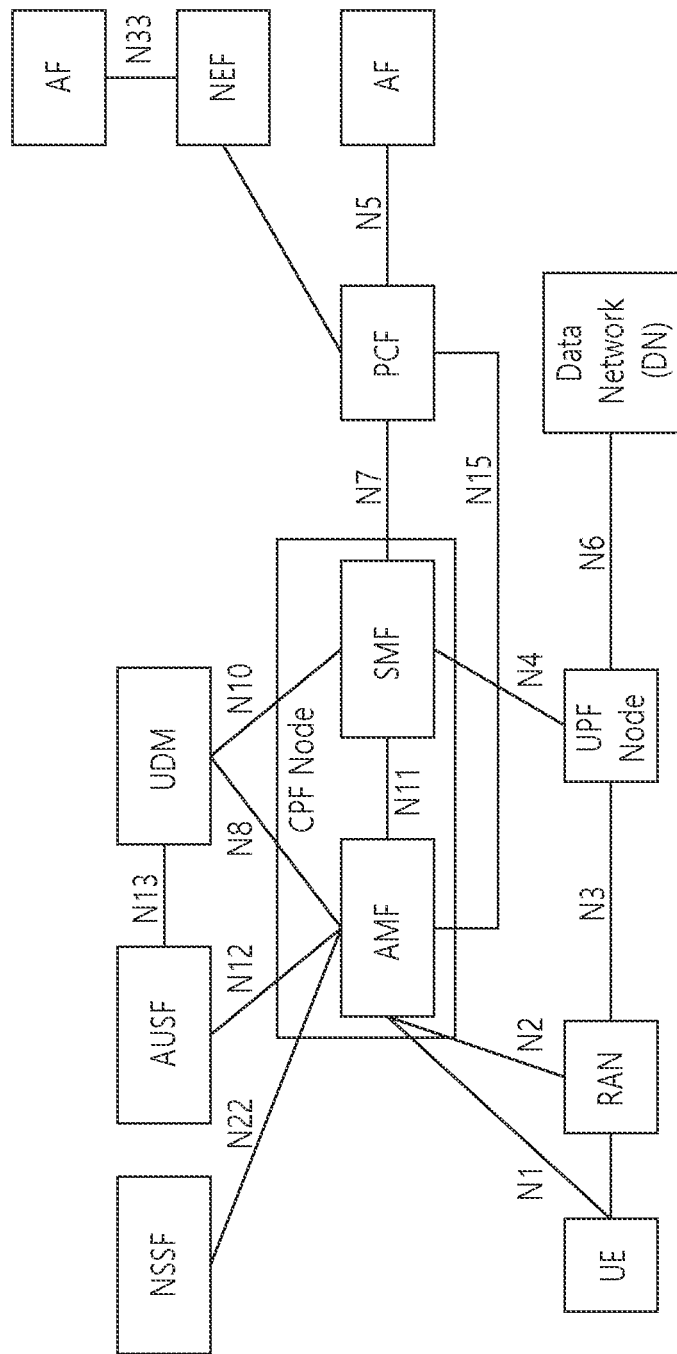
FIG. 2 is an exemplary diagram illustrating a predicted structure of a next generation mobile communication in terms of a node.
Figure 3:
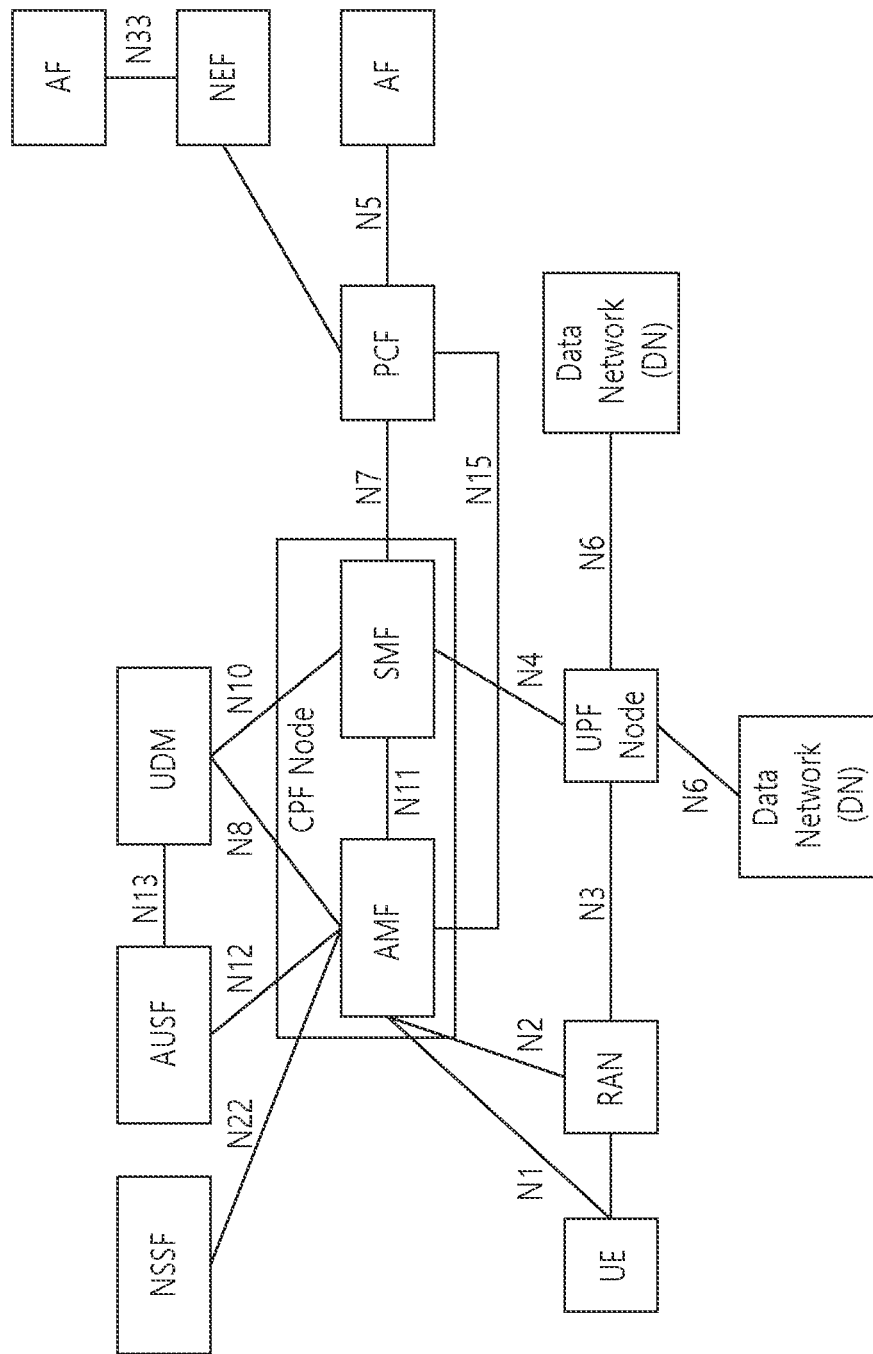
FIG. 3 is an exemplary diagram illustrating an architecture for supporting simultaneously access two data networks.
Figure 4:
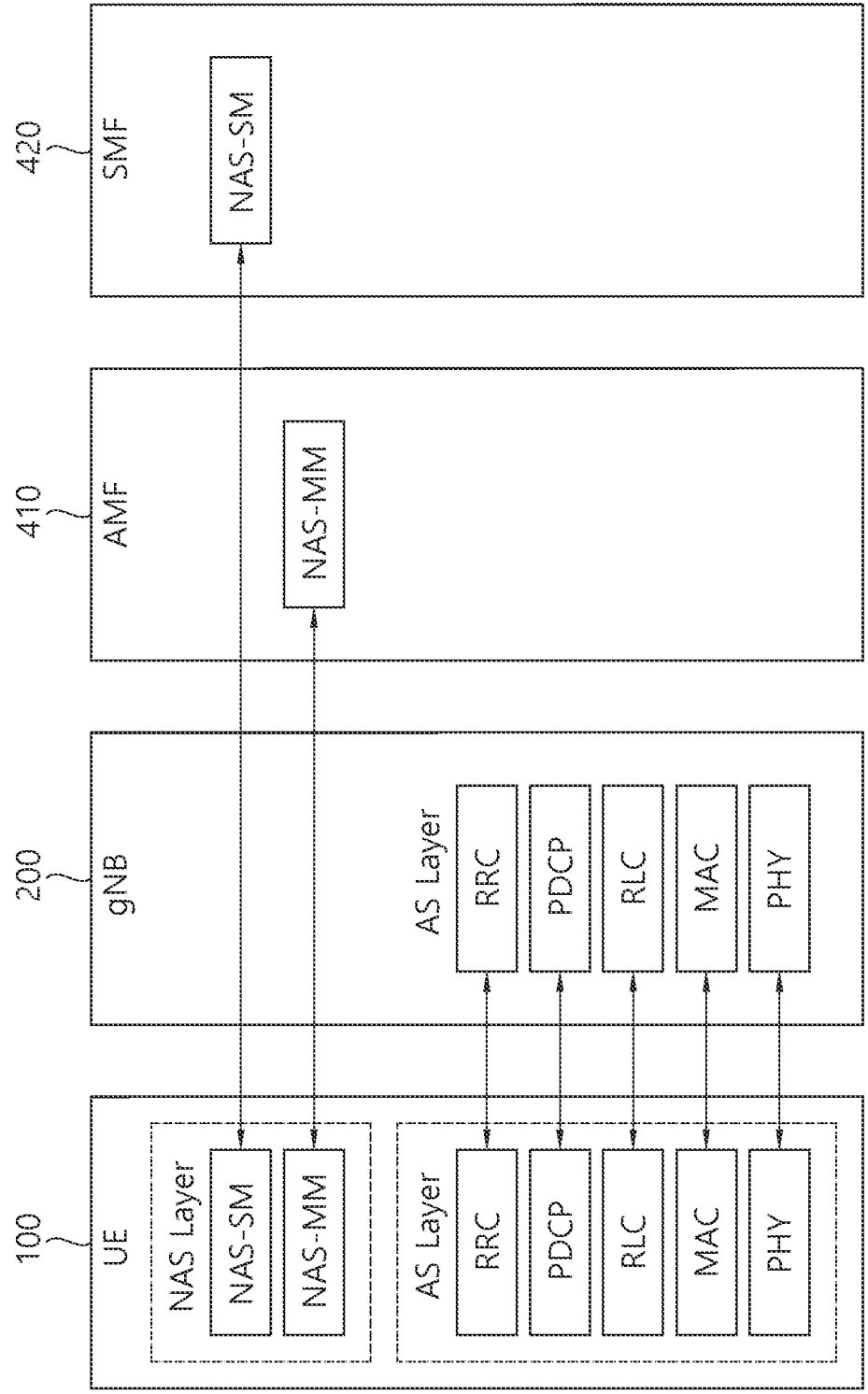
FIG. 4 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new Tracking Area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 5A:
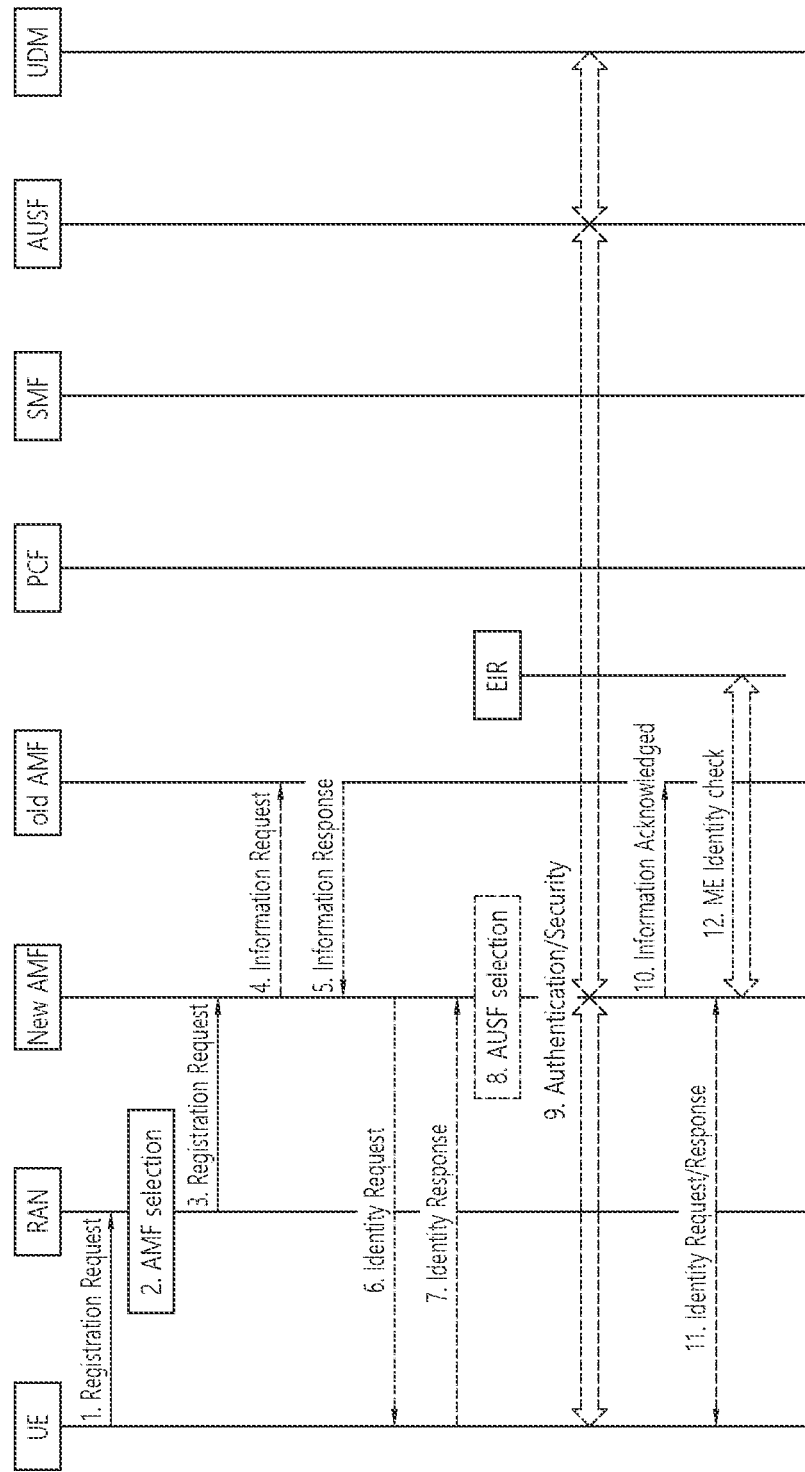
FIGS. 5a and 5b are a signal flowchart illustrating an exemplary registration procedure.
Figure 5B:
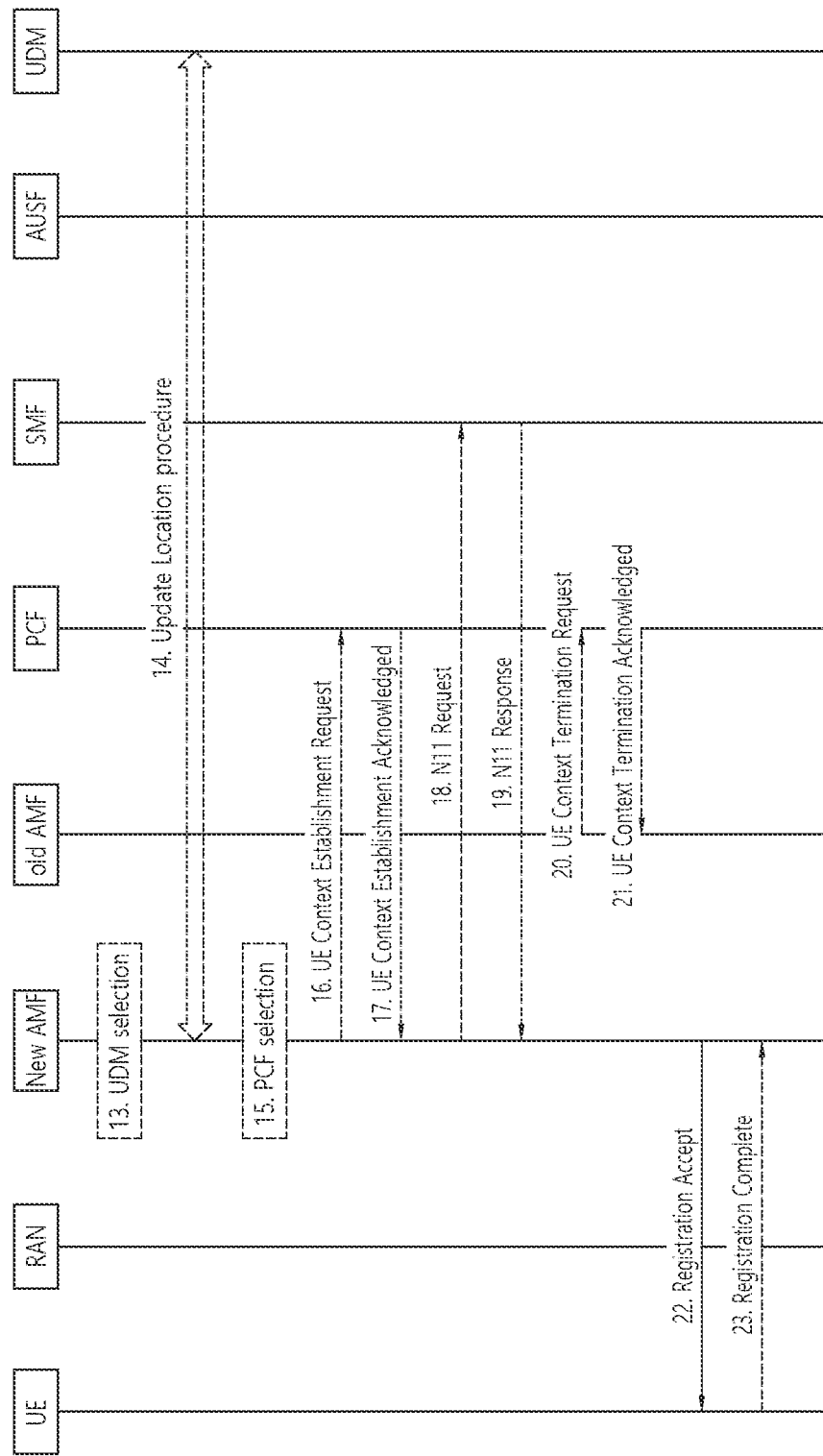

FIGS. 5a and 5b are a signal flowchart illustrating an exemplary registration procedure.

1) The UE may transmit an AN message to the RAN. The AN message may include an AN parameter and a registration request message. The registration request message may include information, such as a register type, a subscriber permanent ID or temporary user ID, a security parameter, Network Slice Selection Assistance Information (NSSAI), 5G capability of the UE, a Protocol Data Unit (PDU) session status, and so on.

In case of a 5G RAN, the AN parameter may include a Subscription Permanent Identifier (SUPI) or a temporary user ID, a selected network, and NSSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s) and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.
16) The new AMF transmits a UE Context Establishment Request message to the PCF. The AMF may request an operator policy for the UE to the PCF.
17) The PCF transmits a UE Context Establishment Acknowledged message to the new AMF.
18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.
20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.
22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
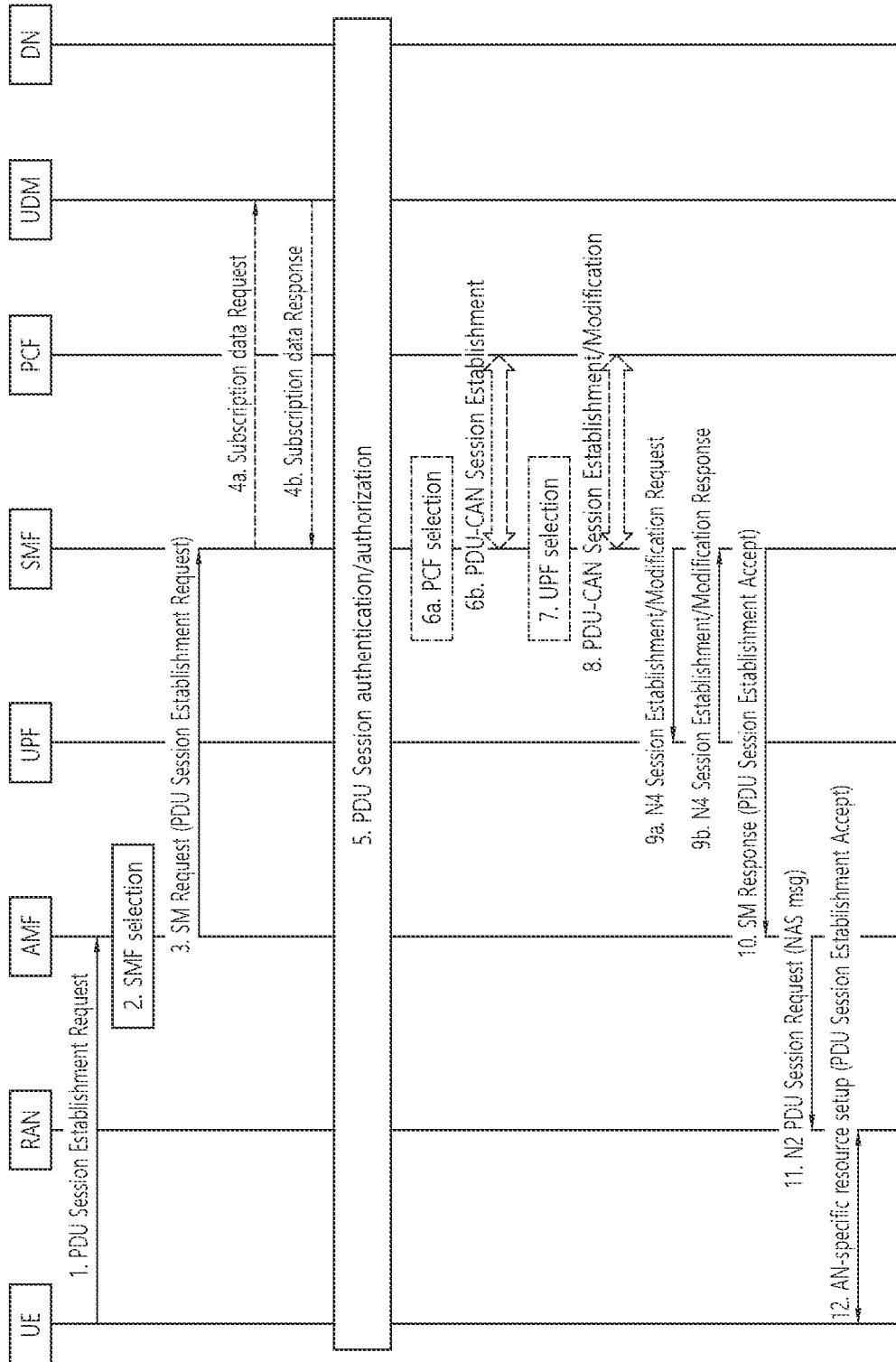
FIGS. 6a and 6b are a signal flowchart illustrating an exemplary PDU session establishment procedure.
Figure 6B:
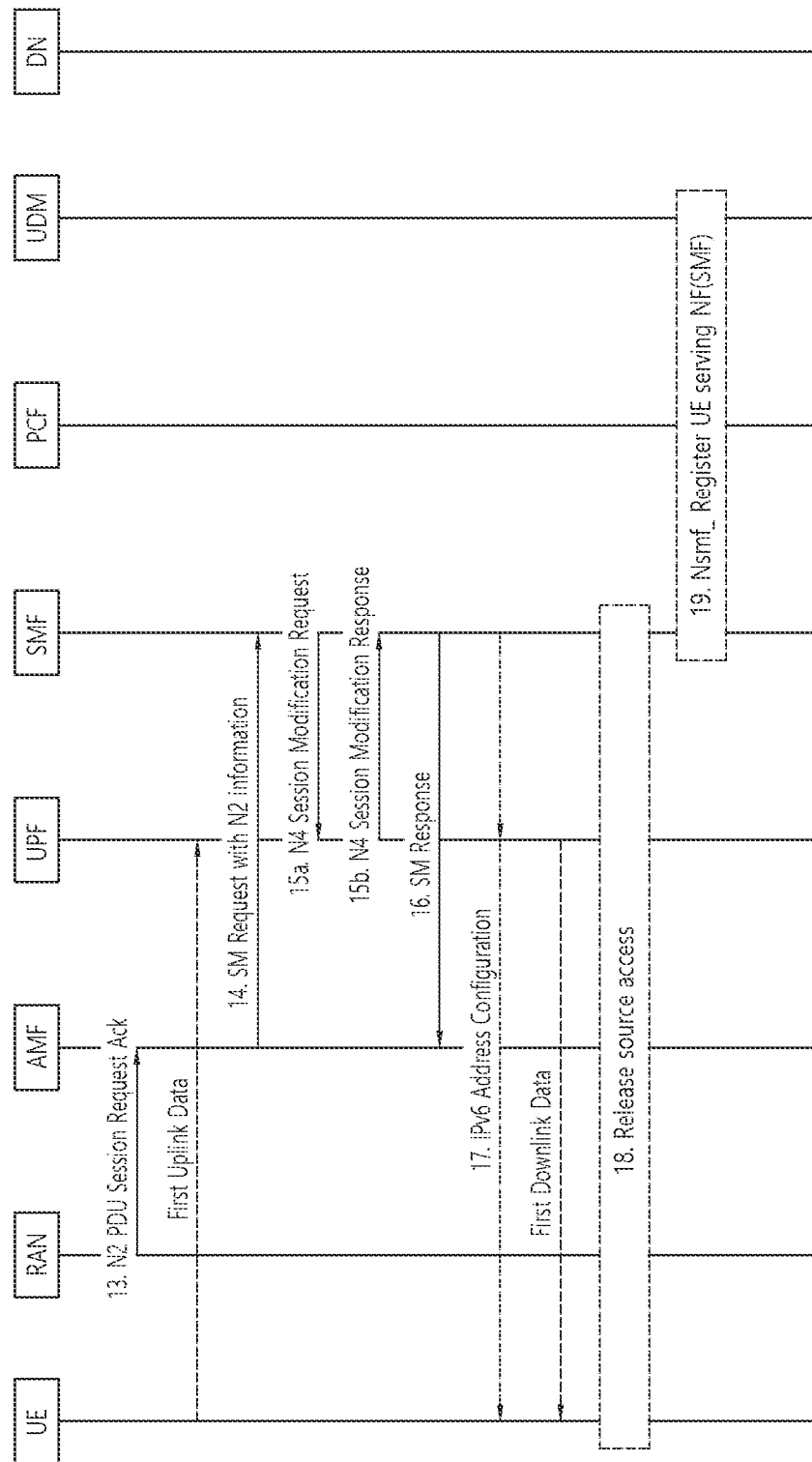

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for HPLMN.

More specifically, the UE may extract and store the allowed NSSAI and the information on the mapped NSSAI, included in the registration accept message received from the network (i.e., AMF) in the registration procedure shown in FIG. 5. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/ Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message.

The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS Flow Identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<Session and Service Continuity>

The next-generation mobile communication network provides various modes to support Session and Service Continuity (SSC).

1) SSC Mode 1

In the PDU session establishment process, the UPF operating as a PDU session anchor is maintained regardless of the access technology (i.e., access type and cell). In the case of an IP-type PDU session, IP continuity is supported regardless of the movement of the UE. SSC mode 1 may be applied to any PDU session type and may also be applied to any access type.

2) SSC Mode 2

When a PDU session has one PDU session anchor, the network may trigger release of the PDU session and instruct the UE to establish the same PDU session. In the process of establishing the new PDU session, a UPF acting as a PDU session anchor may be newly selected. SSC mode 2 may be applied to any PDU session type and may also be applied to any access type.

3) SSC Mode 3

For a PDU session for SSC mode 3, the network may allow the UE to establish a connection using a new PDU session to the same data network before releasing the connection between the UE and the previous PDU session anchor. When the trigger condition is applied, the network may determine whether to select a PDU session anchor, i.e., UPF, suitable for the new condition of the UE. SSC mode 3 may be applied to any PDU session type and may also be applied to any access type.

4) Selection of SSC Mode

An SSC mode selection policy may be used to determine the type of SSC mode associated with the UE's application or UE's application group.

The operator may provide the SSC mode selection policy to the UE. The policy may include one or more SSC mode selection policy rules.

<Notification of User Plane Management Event>

If an Application Function (AF) performs a subscription to receive notification of a User Plane (UP) management event, the SMF may transmit the notification to the AF. The event may include the following.

When the PDU session anchor identified by the AF subscription request is established or released When Data Network Access Identifier (DNAI) is changed When the SMF receives a request for AF notification, and the on-going PDU session meets the conditions for notifying the AF The SMF may use the notification report information received from the PCF to deliver the notification message through the NEF or directly to the AF.

<Problems to be Solved by the Disclosure of the Present Specification>

When the AF in advance subscribes to a service that requests a network control node, e.g., a SMF, to notify an event, i.e., a UP path change, for a specific traffic, the SMF transmits a notification message related to the UP path change for the specific traffic to the AF. After transmitting the notification message, the SMF waits for a response from the AF.

In particular, when the "AF acknowledgment to be expected" indication is set when the AF subscribes to the notification service to the SMF, the SMF should wait for a successful (positive) response message for the AF's application change.

If the SMF receives a negative response message, it may stop the corresponding procedure thereafter. This may not mean that only the corresponding procedure is stopped afterwards, but it may be necessary to perform a procedure to cancel the pre-configured settings of 5GC network nodes, etc., which may increase network signaling and unnecessary processing in some cases.

However, the AF may cause a problem by unnecessarily transmitting a negative response to the SMF, even though it is temporarily delayed due to an overload state or due to a sequential processing according to priority but not in a disabled state.

<Disclosure of the Present Specification>

According to the disclosure of the present specification, a method of preventing transmission of negative responses is proposed, when an AF subscribing to a notification service of a user plane management event receives a notification from the SMF, and when it is determined that a subsequent operation according to the notification cannot be immediately processed, but processing is possible after a certain time.

More specifically, according to the disclosure of the present specification, when the operation to be processed by the AF according to the notification received from the SMF is an application change, and if it is determined that that processing delay (i.e., it is impossible to process immediately, but it is delayed after a certain period of time) due to congestion, overload, or sequential processing according to priority is expected at the time, a method of notifying the SMF of this instead of a negative response is proposed.

According to the disclosure, the coordination between 5GC and AF can be more effectively processed according to the characteristics of the corresponding PDN, application, or UE.

I. First Disclosure: Operation Enhancement of Terminal and Network Node

I-1. Operation Enhancement of Terminal (or UE)

The terminal (or UE) may perform one or more of the following items based on the information included in the NAS message received from the network.

- The terminal (or UE) may directly/indirectly understand that an application server change has occurred in the network.
- Alternatively, the terminal (or UE) may directly/indirectly understand that an application server change may occur in the network after a specific time.
- Based on the specific time value received from the network, the terminal (or UE) manages one or more NAS timers.
- The terminal (or UE) may modify (extend) the value of the NAS transaction timer related to the requested PDU session request.
- When the timer expires, the terminal (or UE) may update the corresponding PDU session state information managed inside the terminal (or UE) to an active state.

I-2. Network Node Function

A network control node, e.g., an SMF, supports the operation of one or more of the following items, along with a relocation decision for UPF change for specific traffic.

- It is checked whether the AF has previously subscribed to a service for requesting a network control node, e.g., the SMF, to notify an event, i.e., a UP path change, for a specific traffic.
- When the notification message regarding the UP path change for specific traffic is transmitted to the AF, the SMF may transmit an indication that the temporary negative notification transmitted by the AF can be additionally processed.
- The SMF waits for the response of the notification message for the UP path change transmitted to the AF. In particular, if the AF subscribes to the notification service of the SMF while delivering the "AF acknowledgment to be expected" indication, the SMF should wait for a response message from the AF.
- Based on the information included in the response message, The SMF may directly/indirectly understand that the application server change has occurred.

In particular, when the AF subscribes to the notification service of the SMF while delivering the "AF acknowledgment to be expected" indication, the SMF performs an operation for controlling the PDU session according to a negative/positive response.

The AF may deliver a temporary negative response. That is, if immediate relocation of application is impossible due to congestion, overload, and sequential processing, but the relocation of the application is certain within a specific time, the AF transmits a temporary negative response to the SMF. This is for the purpose of expressing a will of the AF to perform application relocation. Additionally, the AF may transmit a time value informing how long after application relocation is possible.

After transmitting the temporary negative response, the AF transmits the successful result of the relocation to the SMF after performing the successful application relocation. For this, a service operation may be newly defined or a general message may be used.

Upon receiving a temporary negative response from the AF, the SMF may perform one of the following operations.

- The SMF identifies application characteristics and UE characteristics based on pre-configured local configuration (e.g., Identify application characteristics through Data Network Name (DNN) of PDU session, etc. Identify UE characteristics through information collected from other network function nodes such as Network Data Analytics Function (NWDAF) and AMF, etc.)
- Due to the characteristics of applications and UE, when the speed is high like V2X so it is meaningless unless the relocation of the application is immediate, or when the data rate is too high to exceed the temporarily acceptable buffering capability in the network, or when it is determined based on the value defined by the operator, such as when the relative values of UL and DL data are different (when it is determined that one of the two is more important), The SMF stops the corresponding procedure as in the case of receiving a negative response.

- Due to the characteristics of applications and UE, when AR/VR games are played in a fixed place for a certain period of time, if the relocation of the application is meaningful even afterward for an efficient route, or when it is determined that buffering is possible for a certain time in the network based on the data rate (i.e., when it is acceptable in the network during successful UP relocation), or when it is determined based on the value defined by the operator, such as when the relative values of UL and DL data are different (when it is determined that one of the two is more important), The SMF takes one or more of the following actions to wait for application relocation.

- The transmission of the NAS message to the UE may be delayed by a specific time.
- Transmission to the UE includes a specific time additionally in the NAS message (This is to notify the UE that the PDU session has been established, but the established PDU session will be activated after a certain time, or to extend the NAS transaction time).
- Extend the waiting time for a positive response from the AF (This is to extend the interaction time with AF in order to prevent a case in which no response is received for a certain period of time from being regarded as receiving a negative response).

I-3. Application Example of the First Disclosure

FIG. 7 shows a procedure for notification of a user plane management event.

1) The conditions for AF notification are met. Then, the SMF transmits a notification message to the NF that has subscribed to the notification service of the SMF.

2a) When the AF requests early notification through the NEF, the SMF may notify the NEF of the target DNAI of the PDU session by invoking the Nsmf_EventExposure_Notify service operation.

2b) When the NEF receives Nsmf_EventExposure_Notify, the NEF performs information mapping (i.e., maps AF Transaction Internal ID included in the notification message to AF Transaction Internal ID, and maps SUPI to GPSI), and triggers Nnef_TrafficInfluence_Notify.

2c) When early notification is requested by the AF directly, the SMF notifies the AF of the target DNAI of the PDU session by invoking the Nsmf_EventExposure_Notify service operation.

2d-2e) The AF responds to Nnef_TrafficInfluence_Notify by transmitting an Nnef_TrafficInfluence_AppRelocationInfo message immediately after or after completing any requested application relocation in the new DN. The AF includes the N6 traffic routing details corresponding to the new PSA in the message. When the NEF receives the Nnef_TrafficInfluence_AppRelocationInfo, the NEF may transmit an Nsmf_EventExposure_AppRelocationInfo message to the SMF.

On the other hand, when the AF determines that the application relocation cannot be successfully completed, the AF transmits a negative response.

Alternatively, according to the first disclosure of the present specification, the AF may transmit a temporary negative response. That is, if immediate relocation of application is impossible due to congestion, overload, and sequential processing, but the relocation of the application is certain within a specific time, the AF transmits a temporary negative response to the SMF. This is for the purpose of expressing a will of the AF to perform application relocation. Additionally, the AF may transmit a time value informing how long after application relocation is possible.

Upon transmitting the temporary negative response, the AF transmits the successful result of the relocation to the SMF after performing the successful application relocation. For this, a service operation may be newly defined or a general message may be used.

2f) The AF responds to Nsmf_EventExposure_Notify by invoking the Nsmf_EventExposure_AppRelocationInfo service operation immediately after or after completing any requested application relocation in the new DN. The AF may include the N6 traffic routing details corresponding to the new PSA. For example, if the AF determines that the application relocation cannot be completed successfully, the AF transmits a negative response.

Alternatively, according to the first disclosure of the present specification, the AF may transmit a temporary negative response. That is, if immediate relocation of application is impossible due to overload, and sequential processing, but the relocation of the application is certain within a specific time, the AF transmits a temporary negative response to the SMF. This is for the purpose of expressing a will of the AF to perform application relocation. Additionally, the AF may transmit a time value informing how long after application relocation is possible.

Upon transmitting the temporary negative response, the AF transmits the successful result of the relocation to the SMF after performing the successful application relocation. For this, a service operation may be newly defined or a general message may be used.

3) The SMF performs DNAI modification, addition, modification or removal of UPF.

When runtime coordination between 5GC and AF is enabled by a local configuration, the SMF transmits a notification message to an NF subscribing to the notification message. When receiving a positive response from the AF, the SMF may activate a UP path for a new UPF.

Upon receiving a temporary negative response from AF, the SMF may perform one of the following operations.

The SMF identifies application characteristics and UE characteristics based on pre-configured local configuration (e.g., Identify application characteristics through Data Network Name (DNN) of PDU session, etc. Identify UE characteristics through information collected from other network function nodes such as Network Data Analytics Function (NWDAF) and AMF, etc.)

Due to the characteristics of applications and UE, when the speed is high like V2X so it is meaningless unless the relocation of the application is immediate, the SMF stops the corresponding procedure as in the case of receiving a negative response.

Due to the characteristics of applications and UE, when AR/VR games are played in a fixed place for a certain period of time, if the relocation of the application is meaningful even afterward for an efficient route, the SMF takes actions to wait for application relocation.

The SMF determines a Lifetime value of the PDU session address by considering a pre-configured time value or a time value received from the AF. This value is transmitted to the UE.

In addition, the SMF also adjusts the time value of the PDU session release timer. (i.e., the SMF performs an operation for receiving a positive response with the difference of adjusting the timer value rather than the operation when a negative response is received).

Alternatively, the SMF may extend the waiting time until a positive response is received from the AF by considering a pre-configured time value or a time value received from the AF (i.e., This is to extend the interaction time with AF in order to prevent a case in which no response is received for a certain period of time from being regarded as receiving a negative response).

The SMF transmits a separate NAS message (newly defined or PDU modification message, etc.) including a pre-configured time value or a time value received from the AF to the UE. This is to notify the UE that the application server change can be completed after a certain period of time.

4a) When a late notification via the NEF is requested by the AF, the SMF may notify the NEF of the target DNAI of the PDU session by invoking the Nsmf_EventExposure_Notify service operation. When runtime coordination between 5GC and AF is enabled by the local configuration, the SMF may determine not to activate the UP path to the new UPF, and may wait for a response from the AF. The SMF needs to transmit a late notification before switching the UP path to a new UPF. The SMF needs to wait for aa positive response from the AF to activate the new UP path.

4b) When the NEF receives the Nsmf_EventExposure_Notify, the NEF performs information mapping (i.e. maps the AF Transaction Internal ID included in the notification message to the AF Transaction Internal ID, and maps the SUPI to the GPSI), and triggers the Nnef_EventExposure_Notify message 4c) When a late notification is requested by the AF directly, the SMF notifies the AF of the target DNAI of the PDU session by invoking the Nsmf_EventExposure_Notify service operation.

4d) The AF responds to Nnef_TrafficInfluence_Notify by invoking the Nnef_TrafficInfluence_AppRelocationInfo service operation immediately after or after completing any requested application relocation in the new DN. The AF includes N6 traffic routing details corresponding to the new PSA. If the AF determines that the application relocation cannot be completed successfully, the AF transmits a negative response.

Alternatively, according to the first disclosure of the present specification, the AF may transmit a temporary negative response. That is, if immediate relocation of application is impossible due to overload, and sequential processing, but the relocation of the application is certain within a specific time, the AF transmits a temporary negative response to the SMF. This is for the purpose of expressing a will of the AF to perform application relocation. Additionally, the AF may transmit a time value informing how long after application relocation is possible.

Upon transmitting the temporary negative response, the AF transmits the successful result of the relocation to the SMF after performing the successful application relocation. For this, a service operation may be newly defined or a general message may be used.

4e) When the NEF receives Nnef_TrafficInfluence_AppRelocationInfo, the NEF may trigger an Nsmf_EventExposure_AppRelocationInfo message.

4f) The AF responds to Nsmf_EventExposure_Notify by invoking the Nsmf_EventExposure_AppRelocationInfo service operation immediately after or after completing any requested application relocation in the new DN. The AF may include the N6 traffic routing details corresponding to the new PSA. For example, if the AF determines that the application relocation cannot be completed successfully, the AF transmits a negative response.

Alternatively, according to the first disclosure of the present specification, the AF may transmit a temporary negative response. That is, if immediate relocation of application is impossible due to overload, and sequential processing, but the relocation of the application is certain within a specific time, the AF transmits a temporary negative response to the SMF. This is for the purpose of expressing a will of the AF to perform application relocation. Additionally, the AF may transmit a time value informing how long after application relocation is possible.

Upon transmitting the temporary negative response, the AF transmits the successful result of the relocation to the SMF after performing the successful application relocation. For this, a service operation may be newly defined or a general message may be used.

5) Upon receiving a temporary negative response from the AF, the SMF may perform one of the following operations.

The SMF identifies application characteristics and UE characteristics based on pre-configured local configuration (e.g., Identify application characteristics through Data Network Name (DNN) of PDU session, etc. Identify UE characteristics through information collected from other network function nodes such as Network Data Analytics Function (NWDAF) and AMF, etc.)

Due to the characteristics of applications and UE, when the speed is high like V2X so it is meaningless unless the relocation of the application is immediate, the SMF stops the corresponding procedure as in the case of receiving a negative response.

Due to the characteristics of applications and UE, when AR/VR games are played in a fixed place for a certain period of time, if the relocation of the application is meaningful even afterward for an efficient route, the SMF takes actions to wait for application relocation.

The SMF determines a Lifetime value of the PDU session address by considering a pre-configured time value or a time value received from the AF. This value is transmitted to the UE.

Alternatively, the SMF transmits a separate NAS message (newly defined or PDU modification message, etc.) including a pre-configured time value or a time value received from the AF to the UE. This is to notify the UE that the application server change can be completed after a certain period of time.

Alternatively, the SMF may extend the waiting time until a positive response is received from the AF by considering a pre-configured time value or a time value received from the AF (i.e., This is to extend the interaction time with AF in order to prevent a case in which no response is received for a certain period of time from being regarded as receiving a negative response).

In this case, in order to delay the transmission of the response to the PDU session request message transmitted by the UE, the timer value of the SMF that processes the NAS message is extended. In addition, a NAS message for extending the NAS transaction time is transmitted to the UE.

Figure 8:
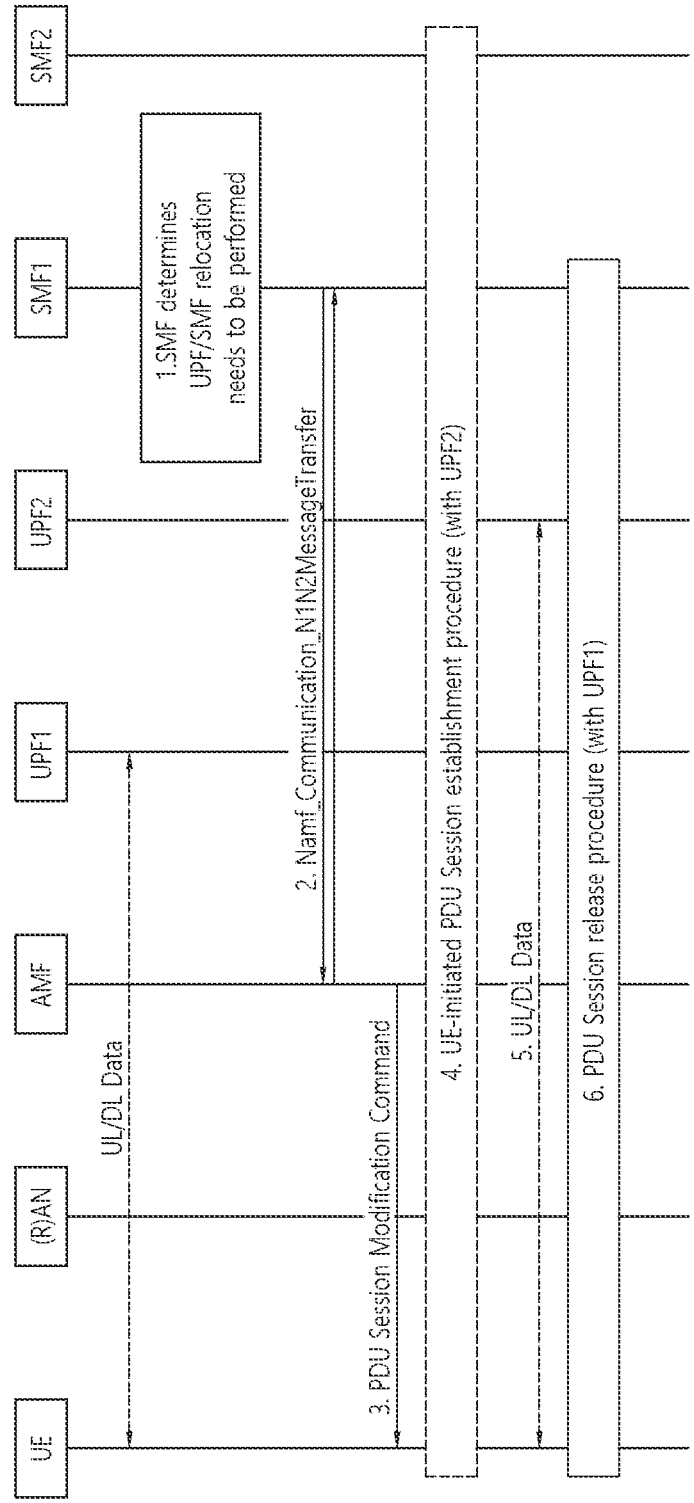
FIG. 8 shows a procedure for changing a PDU session anchor having multiple PDU sessions with SSC mode 3.

FIG. 8 shows a procedure for changing a PDU session anchor having multiple PDU sessions with SSC mode 3.

For the terminal (or UE), in order to change the PDU session anchor responsible for the PDU session with SSC mode 3, the SMF may trigger the following procedure.

After a new PDU session directed to the same DN is established with the new PDU session anchor, the previous PDU session anchor may release the existing PDU session. The new PDU session anchor may be controlled by the same SMF as the previous PDU session anchor. The SMF may determine that a new SMF needs to be reallocated.

1) The SMF may determine that the serving UPF or SMF needs to be changed. When the "Indication of Application relocation possibility" attribute in the PCC rule indicates that the DNAI already selected for any application is not changed, the SMF may determine that the change of the SMF is not necessary.

2) Although not shown, after performing step 1 above, the network node (e.g., SMF1) decides whether to transmit a notification to the AF based on the capability information of the UE, the location information of the UE obtained from the AMF, the corresponding session information, the service information subscribed by the AF in advance, the pre-configured policy, etc.

3) When the AF transmits an "AF acknowledgment to be expected" indication while subscribing to the notification service of the SMF, and the SMF transmits an Early Notification to the AF, and runtime coordination between 5GC and AF is enabled by the local configuration, the SMF waits for a notification response from the AF. When the SMF receives a negative response from the AF, the SMF stops the procedure.

Alternatively, according to the first disclosure of the present specification, the AF may transmit a temporary negative response. That is, if immediate relocation of application is impossible due to overload, and sequential processing, but the relocation of the application is certain within a specific time, the AF transmits a temporary negative response to the SMF. This is for the purpose of expressing a will of the AF to perform application relocation. Additionally, the AF may transmit a time value informing how long after application relocation is possible.

Upon transmitting the temporary negative response, the AF transmits the successful result of the relocation to the SMF after performing the successful application relocation. For this, a service operation may be newly defined or a general message may be used.

Upon receiving a temporary negative response from AF, the SMF may perform one of the following operations.

The SMF identifies application characteristics and UE characteristics based on pre-configured local configuration (e.g., Identify application characteristics through Data Network Name (DNN) of PDU session, etc.
Identify UE characteristics through information collected from other network function nodes such as Network Data Analytics Function (NWDAF) and AMF, etc.)

Due to the characteristics of applications and UE, when the speed is high like V2X so it is meaningless unless the relocation of the application is immediate, the SMF stops the corresponding procedure as in the case of receiving a negative response.

Due to the characteristics of applications and UE, when AR/VR games are played in a fixed place for a certain period of time, if the relocation of the application is meaningful even afterward for an efficient route, the SMF takes actions to wait for application relocation.

The SMF determines a Lifetime value of the PDU session address by considering a pre-configured time value or a time value received from the AF. This value is transmitted to the UE.

In addition, the SMF also adjusts the time value of the PDU session release timer. (i.e., the SMF performs an operation for receiving a positive response with the difference of adjusting the timer value rather than the operation when a negative response is received).

Alternatively, the SMF may extend the waiting time until a positive response is received from the AF by considering a pre-configured time value or a time value received from the AF (i.e., This is to extend the interaction time with AF in order to prevent a case in which no response is received for a certain period of time from being regarded as receiving a negative response).

The SMF transmits a separate NAS message (newly defined or PDU modification message, etc.) including a pre-configured time value or a time value received from the AF to the UE. This is to notify the UE that the application server change can be completed after a certain period of time.

When the PDU session ID indicates an existing PDU session to be relocated and the cause field indicates that re-establishment of a PDU session for the same DN is requested, the SMF invokes Namf_Communication_N1N2MessageTransfer. The Namf_Communication_N1N2MessageTransfer may include a PDU session ID, an SMF reallocation request indication, and an N1 SM container. The N1 SM container may include a PDU session modification command. The PDU session modification command may include a cause and PCO. The PCO may include a PDU session address lifetime value.

The SMF reallocation request indication may indicate that the SMF needs to be reallocated.

The PDU session address lifetime value is transmitted to the upper layer of the UE, and may indicate how long the network will maintain the PDU session. The SMF starts a PDU session release timer corresponding to the PDU session address lifetime value.

The AMF delivers the NAS message to the UE. When the release timer value is included in the PDU session modification command, the UE may transmit the release timer value to the upper layer.

4) When the UE receives a PDU session modification command, the UE may determine to initiate a PDU session establishment procedure directed to the same DN.

To this end, according to the SSC mode, the UE may generate a new PDU session ID and initiate a PDU session establishment request using the new PDU session ID. The new PDU session ID may be included in a PDU session ID field in the NAS request message, and an existing PDU session ID indicating an existing PDU session to be released may also be included in the NAS request message.

When the SMF reallocation is requested, the AMF may select another SMF. Otherwise, the AMF may transmit an Nsmf_PDUSession_CreateSMContext request message to the same SMF in charge of the existing PDU session ID.

The AMF may include both the PDU session ID and the existing PDU session ID in the Nsmf_PDUSession_CreateSMContext request message. The SMF may store a new PDU session ID and select a new PDU session anchor.

When runtime coordination between 5GC and AF is enabled by the local configuration, and when the AF delivers an "AF acknowledgment to be expected" indication while subscribing to SMF's notification service, the SMF transmits a late notification to the AF, and waits for a response from the AF. When the SMF receives a negative response from the AF, the SMF ends the procedure. Otherwise, the SMF performs a procedure of activating the UP path of a new PDU session.

Alternatively, according to the first disclosure of the present specification, the AF may transmit a temporary negative response. That is, if immediate relocation of application is impossible due to overload, and sequential processing, but the relocation of the application is certain within a specific time, the AF transmits a temporary negative response to the SMF. This is for the purpose of expressing a will of the AF to perform application relocation. Additionally, the AF may transmit a time value informing how long after application relocation is possible.

Upon transmitting the temporary negative response, the AF transmits the successful result of the relocation to the SMF after performing the successful application relocation. For this, a service operation may be newly defined or a general message may be used.

Upon receiving a temporary negative response from AF, the SMF may perform one of the following operations.

The SMF identifies application characteristics and UE characteristics based on pre-configured local configuration (e.g., Identify application characteristics through Data Network Name (DNN) of PDU session, etc. Identify UE characteristics through information collected from other network function nodes such as Network Data Analytics Function (NWDAF) and AMF, etc.)

Due to the characteristics of applications and UE, when the speed is high like V2X so it is meaningless unless the relocation of the application is immediate, the SMF stops the corresponding procedure as in the case of receiving a negative response.

Due to the characteristics of applications and UE, when AR/VR games are played in a fixed place for a certain period of time, if the relocation of the application is meaningful even afterward for an efficient route, the SMF takes actions to wait for application relocation.

The SMF waits for a corresponding amount of time by considering a pre-configured time value or a time value received from the AF, and then transmits a PDU session acceptance message to the UE.

Alternatively, the SMF transmits a PDU session accept message including a pre-configured time value or a time value received from the AF. This is to notify the UE that the PDU session has been established, but that the session will be activated after a certain time.

Alternatively, the SMF may extend the waiting time until a positive response is received from the AF by considering a pre-configured time value or a time value received from the AF (i.e., This is to extend the interaction time with AF in order to prevent a case in which no response is received for a certain period of time from being regarded as receiving a negative response).

In this case, in order to delay the transmission of the response to the PDU session request message transmitted by the UE, the timer value of the SMF that processes the NAS message is extended. In addition, a NAS message for extending the NAS transaction time is transmitted to the UE.

Meanwhile, when the SMF is changed during the process of establishing a new PDU session, the following operation may be performed.

If the time value configured in the new SMF or the time value received from the AF is greater than the PDU session address lifetime value transmitted by the previous SMF to the UE in step 3 above, Measures are needed to prevent the previous PDU session from being released before a new PDU session is established in the network. Accordingly, one or more of the following operations may be performed.

i. When the late notification is used, it may be configured to always use the same SMF.

ii. Upon receiving the NAS message for extending the NAS transaction time from the new SMF, the UE may directly transmit NAS signaling to the previous SMF to prevent PDU session release, i.e., to extend the SMF time value.

iii. The AF transmits a temporary negative response and a specific time value to the new SMF, and at the same time, transmits a message to the new SMF to prevent PDU session release, i.e., to extend the SMF time value.

5) After the new PDU session is established, the UE uses the IP address/prefix associated with the new PDU session for all new traffic, and transfers the existing traffic flow from the previous PDU session to the new PDU session.
   6) Before the timer expires, the previous PDU session may be released by the UE or by the SMF according to the timer expiration.

Figure 9:
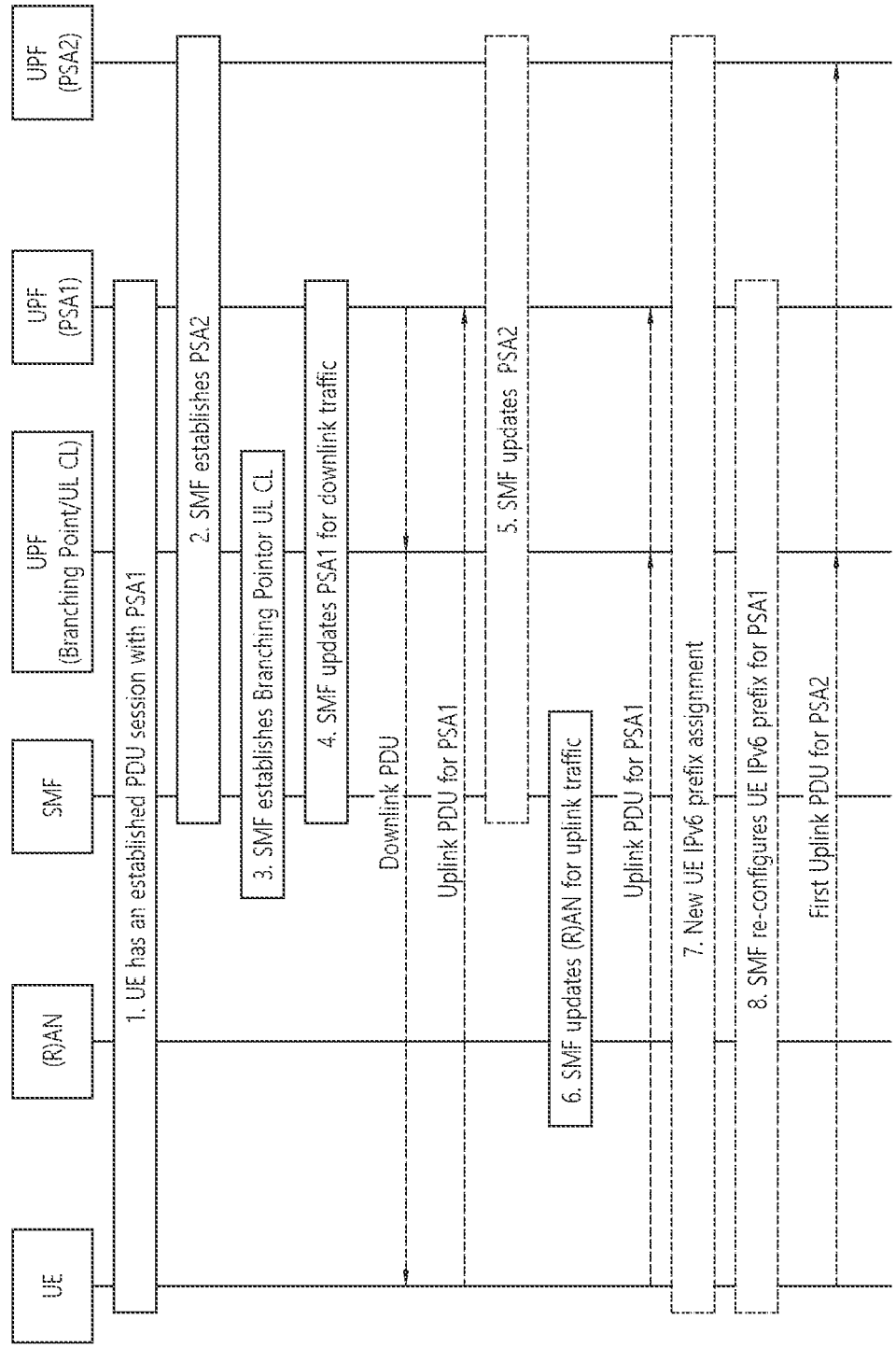
FIG. 9 shows a procedure for adding an additional PDU session anchor and a Branching Point or UL CL.

FIG. 9 shows a procedure for adding an additional PDU session anchor and a Branching Point or UL CL.

1) The UE has an established PDU session with a UPF including PDU session anchor 1. The User Plane (UP) of the PDU session includes an Access Network (AN) and a PDU session anchor 1.
   2) Although not shown, after the step 1 above, the network may determine whether to transmit a notification message to the AF based on the capability information of the UE, the location information of the UE obtained from the AMF, the corresponding session information, the service information subscribed by the AF in advance, the pre-configured policy, etc.

The SMF may decide to establish a new PDU session anchor due to UE movement, new flow detection. The SMF may select the UPF and establish a new PDU session anchor 2 using N4. In case of an IPv6 multi-homed PDU session, the SMF may allocate a new IPv6 prefix corresponding to PSA2. In addition, when the PCF subscribes to the IP allocation/release event, the SMF may perform a session management policy modification procedure in order to provide the newly allocated IPv6 prefix to the PCF.

When runtime coordination between 5GC and AF is enabled by the local configuration, and when AF delivers an "AF acknowledgment to be expected" indication while subscribing to SMF's notification service, the SMF transmits an Early Notification to the AF before a new PSA (PSA2 in the drawing) is selected, and waits for a response from the AF before establishing a new PSA. If the SMF receives a negative notification response from the AF, the SMF may stop the procedure.

In the case of a UL Uplink Classifier (CL) scenario and a Branching Point (i.e., IPv6 multi-homing) scenario, when the SMF receives a temporary negative response from the AF, the SMF may transmit a cause directly or indirectly implying that the change of the application server is not successful to the UE through a separate NAS message. In particular, it may additionally inform that the change of the application server occurs after a predetermined time.

3) The SMF selects the UPF and establishes a Branching Point (Ipv6 multi-homing) or a UL CL for a PDU session using N4. The SMF delivers the uplink forwarding rule including PSA1 CN tunnel information and PSA2 CN tunnel information to the PSA1 and the PSA2. AN tunnel information may be additionally transmitted for downlink forwarding. For IPv6 multi-homing, SMF provides a traffic filter indicating which traffic should be directed to the PSA1 and the PSA2 respectively. The traffic filter is a traffic filter for IPv6 prefixes corresponding to the PSA1 and the PSA2.

In the case of UL CL, a traffic filter indicating which traffic should be delivered to the PSA1 and the PSA2, respectively, may be provided. When runtime coordination between 5GC and AF is enabled by the local configuration, and when AF delivers an "AF acknowledgment to be expected" indication while subscribing to SMF's notification service, the SMF transmits the Late Notification to the AF, and waits for a response from the AF. If the SMF receives a negative notification response from the AF, the SMF may stop the procedure.

In the case of the UL CL (Uplink Classifier) scenario, when the SMF receives a temporary negative response from the AF, the SMF may transmit a cause directly or indirectly implying that the change of the application server is not successful to the UE through a separate NAS message. In particular, it may additionally inform that the change of the application server occurs after a predetermined time.

4) The SMF may update the PSA1 via N4. The SMF may provide Branching Point or UL CL CN tunnel information for downlink traffic.
   5) The SMF updates the PSA2 through N4. The SMF provides Branching Point or UL CL CN tunnel information for downlink traffic.
   6) The SMF updates AN through N2 SM information on N11. The SMF provides new CN tunnel information corresponding to the UPF (Branching Point or UL CL). In the case of the UL CL, when an existing UPF exists between UL CLs into which the AN is newly inserted, the SMF updates the existing UPF instead of the AN.
   7) In case of IPv6 multi-homing, the SMF informs the UE that a new IP prefix is available in the PSA2. In addition, the SMF provides an IPv6 multi-home routing rule to the UE according to the IPv6 prefix.

When runtime coordination between 5GC and AF is enabled by the local configuration, and when AF delivers an "AF acknowledgment to be expected" indication while subscribing to SMF's notification service, the SMF transmits the Late Notification to the AF, and waits for a response from the AF before transmitting a new IP prefix to the UE. If the SMF receives a negative notification response from the AF, the SMF may stop the procedure.

In the case of a Branching Point (i.e. IPv6 multi-homing) scenario, if the SMF receives a temporary negative response from the AF, the SMF may transmit a cause directly or indirectly implying that the change of the application server is not successful to the UE through a separate NAS message. In particular, it may additionally inform that the change of the application server occurs after a predetermined time.

8) In case of IPv6 multihoming, the SMF reconfigures the UE for the original IP prefix in the PSA1. The SMF transmits the IPv6 multi-home routing rule to the UE according to the IPv6 prefix.

II. Various Implementations

Figure 10A:
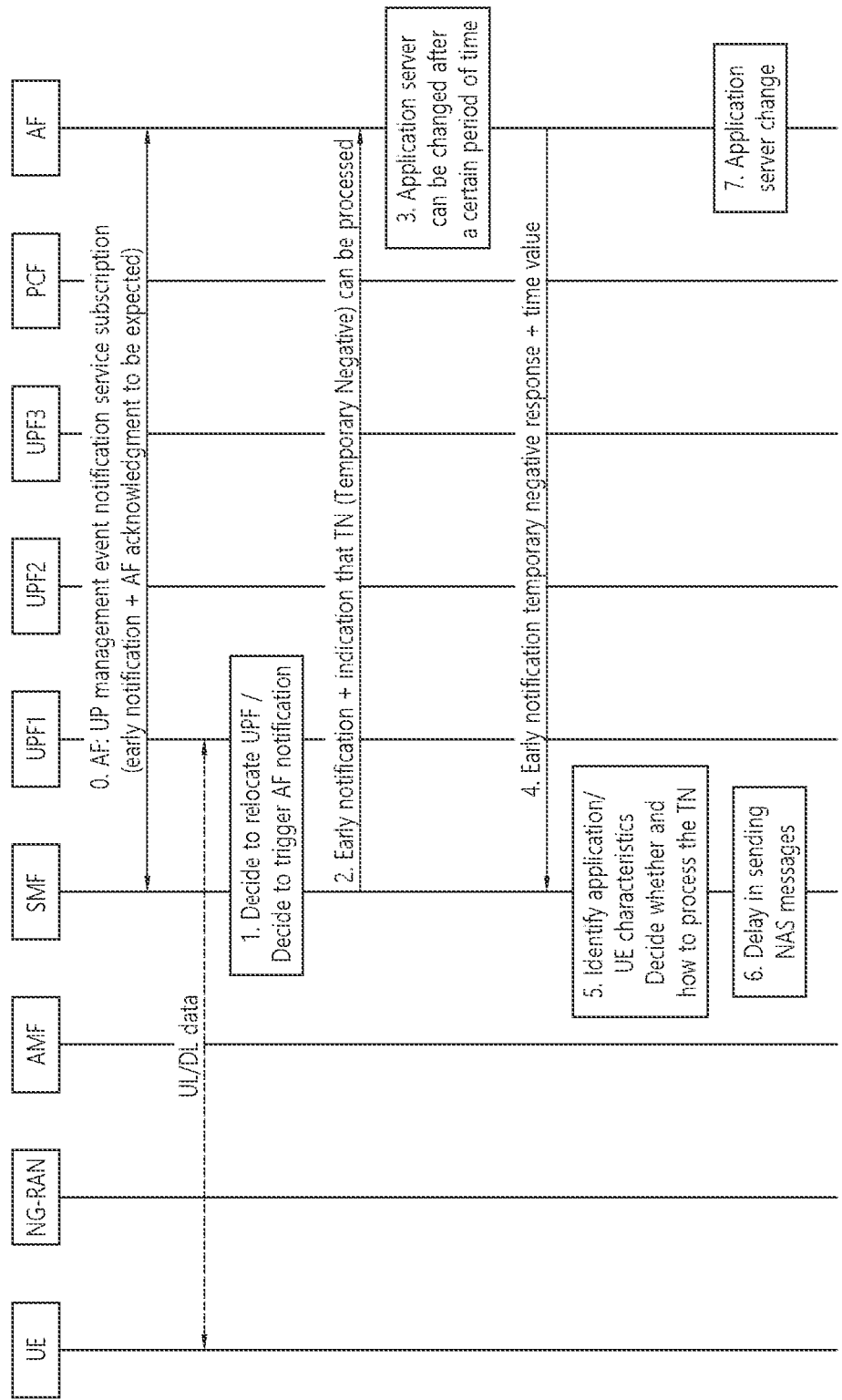
FIGS. 10a and 10b show a procedure for early notification in SSC mode 3 according to a first implementation example.
Figure 10B:
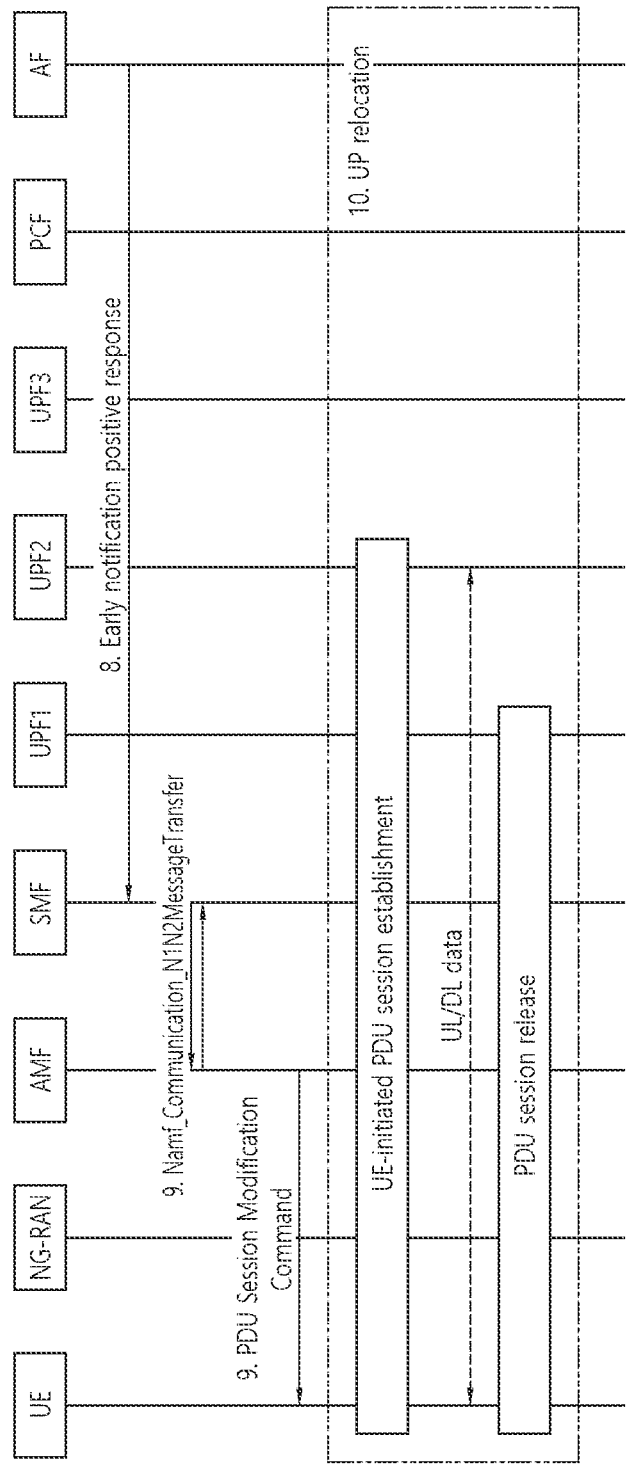

FIGS. 10*a* and 10*b* show a procedure for early notification in SSC mode 3 according to a first implementation example.

0) The AF subscribed to SMF's service for UP management event notification, and the UE is transmitting UL/DL data with the network via the UPF1.

Specifically, the AF may request to subscribe to the notification service for the change of the UP path related to traffic. The AF's request may include the following.

Subscription type (e.g., subscription for early notification and/or late notification) AF's subscription may be for early notification or late notification. In the case of a subscription for early notification, the SMF transmits a notification message before a new UP path is established. In the case of subscription for late notification, the SMF transmits a notification message after a new UP path is established.

"AF acknowledgment to be expected" indication

Indicates that the AF will transmit a response message for the notification of a UP path management event. Upon receiving the indication, the SMF decides to wait for a response message from the AF before establishing a new UP path in case of early notification, and after activating a new UP path in case of late notification.

1) The network node determines whether to process temporary negative responses and whether to transmit a notification to the AF based on the capability information of the UE, the location information of the UE obtained from the AMF, the corresponding session information, the service information subscribed by the AF in advance, the pre-configured policy, etc.

2) The SMF informs that it has the ability to process temporary negative responses with Early Notification.

3) The AF determines whether application relocation can be processed within a specific time, although immediate application relocation is not possible due to overload and sequential processing.

4) The AF transmits a temporary negative response to the SMF. This is for the purpose of expressing a will of the AF to perform application relocation. Additionally, the AF may transmit a time value informing how long after application relocation is possible.

5) Upon receiving a temporary negative response from the AF, the SMF identifies application characteristics and UE characteristics, and determines whether and how to process the temporary negative response.

The SMF identifies application characteristics and UE characteristics based on pre-configured local configuration (e.g., Identify application characteristics through DNN of PDU session, etc. Identify UE characteristics through information collected from other network function nodes such as NWDAF and AMF, etc.)

Due to the characteristics of applications and UE, when the speed is high like V2X so it is meaningless unless the relocation of the application is immediate, the SMF stops the corresponding procedure as in the case of receiving a negative response.

Due to the characteristics of applications and UE, when AR/VR games are played in a fixed place for a certain period of time, if the relocation of the application is meaningful even afterward for an efficient route, the SMF takes actions to wait for application relocation.

6) The SMF delays the transmission of the NAS message to the UE by a specific time. For example, after waiting for the corresponding amount of time by considering a pre-configured time value or a time value received from the AF (i.e., delaying processing of NAS messages, storing NAS messages to be transmitted in a buffer, etc.), the SMF transmits a PDU session accept message to the UE.

7-8) Upon transmitting the temporary negative response, the AF transmits the successful result of the relocation to the SMF after performing the successful application relocation.

Figure 11A:
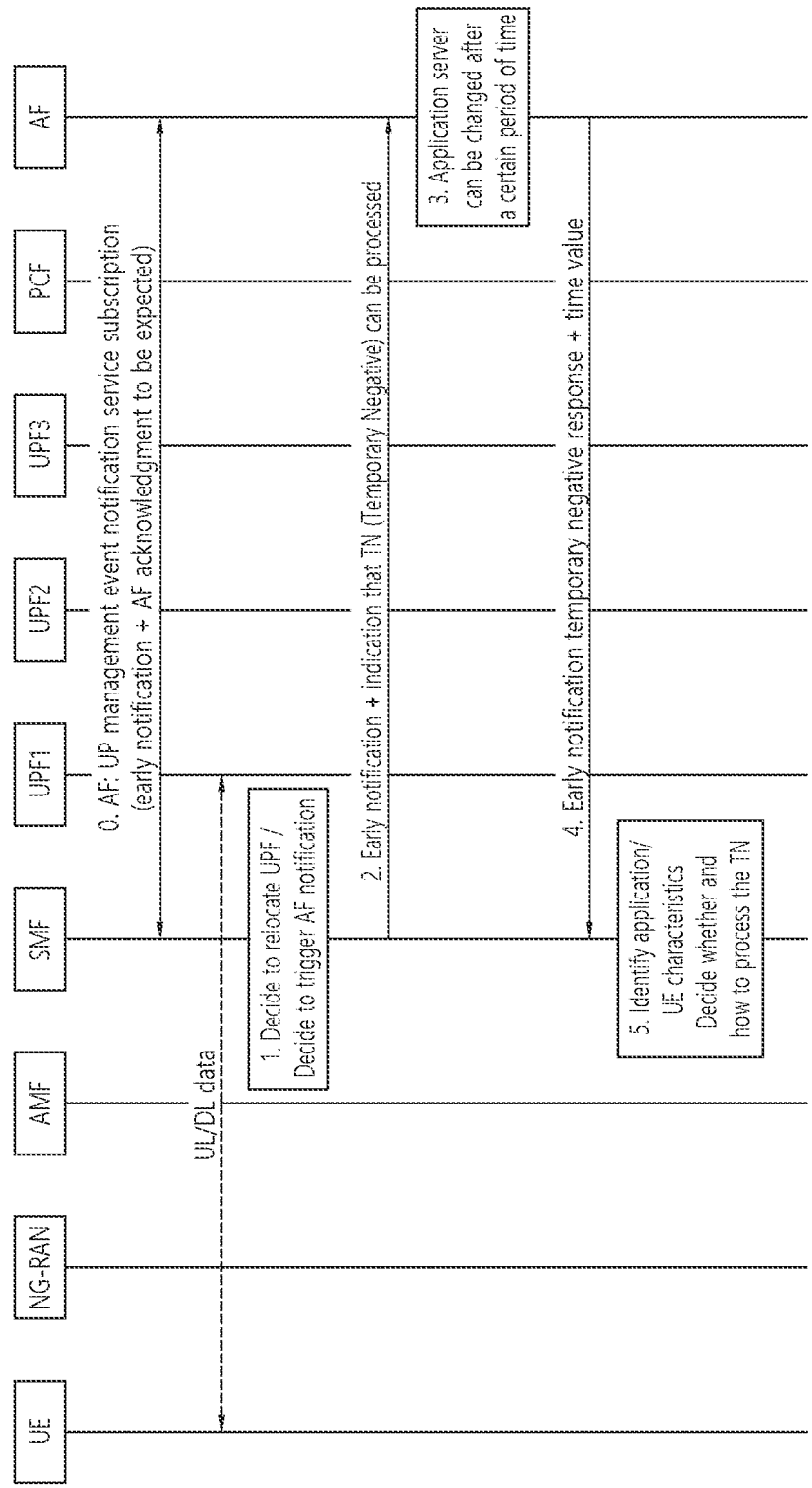
FIGS. 11a and 11b show a modified example of the first implementation example shown in FIG. 10.
Figure 11B:
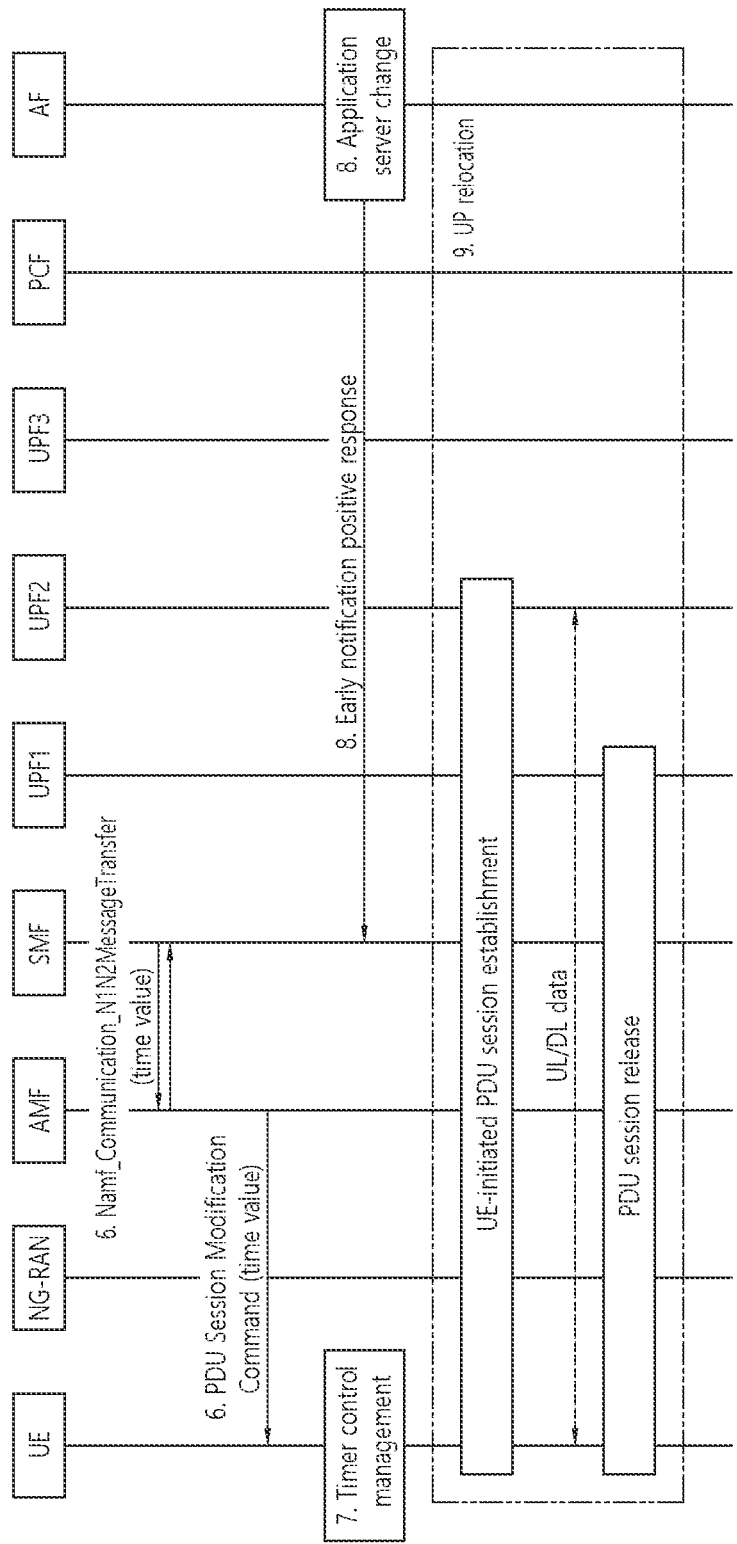

FIGS. 11*a* and 11*b* show a modified example of the first implementation example shown in FIG. 10.

1-5) Since these steps are similar to the steps of 1-5 of FIG. 10, the description of FIG. 10 will be followed without repeated description.

6) The AMF transmits a NAS message to the UE including a pre-configured time value or a time value received from the AF. This is to notify the UE that the PDU session has been established, but the established PDU session will be activated after a certain time The time value transmitted to the UE may be included in a separate field, or a normally transmitted value may be recycled. For example, the lifetime value of the PDU session address may be determined by considering a pre-configured time value or a time value received from the AF. In addition, the SMF may adjust the PDU session release timer to the same value (i.e., to adjust the time so that both the UE and the network node can wait for the application change).

Based on the information received from the network, the UE checks the success/failure of application server change, and in particular, when receiving a specific time value, the UE controls to delay the session in the active state. For example, the UE delays the transmission of the PDU session request message, or, if it is a PDU session established without delay, the UE marks and manages it as an inactive state during state management.

Upon transmitting the temporary negative response, the AF transmits the successful result of the relocation to the SMF after performing the successful application relocation.

Figure 12B:
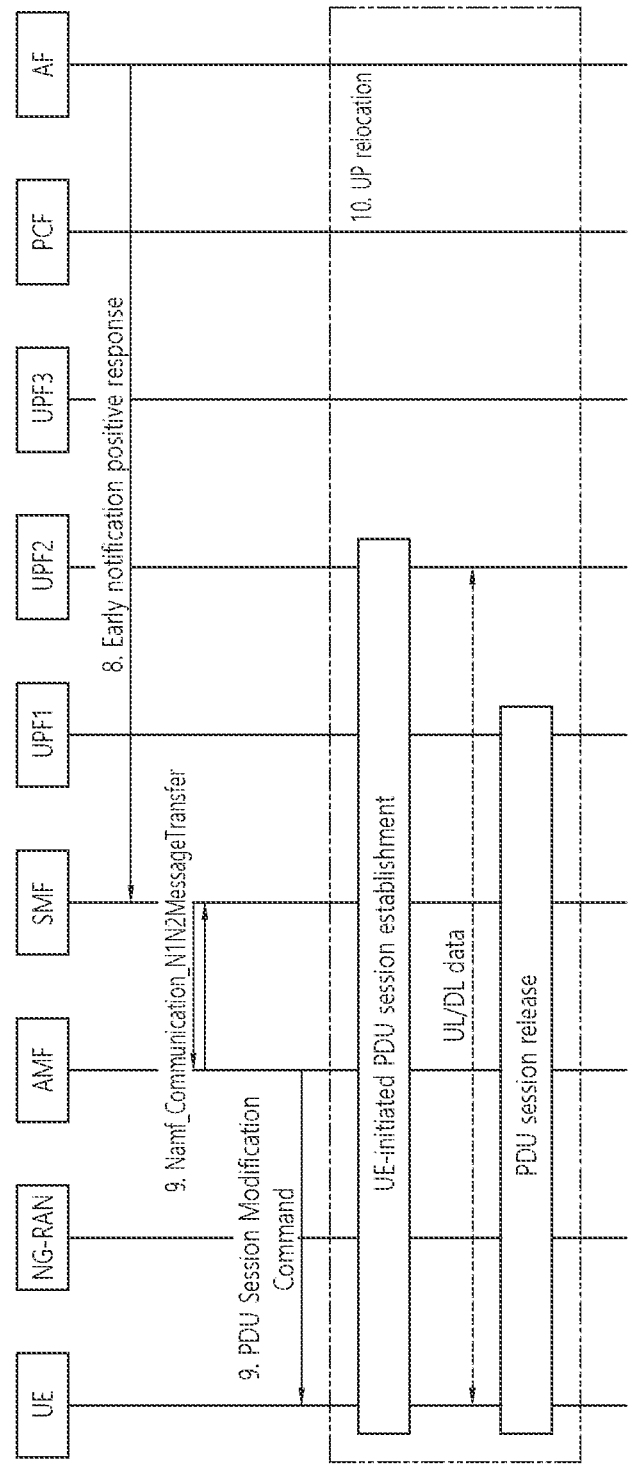

FIGS. 12*a* and 12*b* show another modified example of the first implementation example shown in FIG. 10.

1-5) Since these steps are similar to the steps of 1-5 of FIG. 10, the description of FIG. 10 will be followed without repeated description.

6) The SMF extends the waiting time until a positive response is received from the AF by considering a pre-configured time value or a time value received from the AF (In general, if no response is received for a certain period of time, it is assumed that a negative response has been received, so that the time for interaction with the AF is extended).

The SMF transmits a NAS message (newly defined or using PDU modification message, etc.) including a pre-configured time value or a time value received from the AF to the UE. This may notify the UE that the application server change can be completed after a certain period of time.

Upon transmitting the temporary negative response, the AF transmits the successful result of the relocation to the SMF after performing the successful application relocation.

Figure 13A:
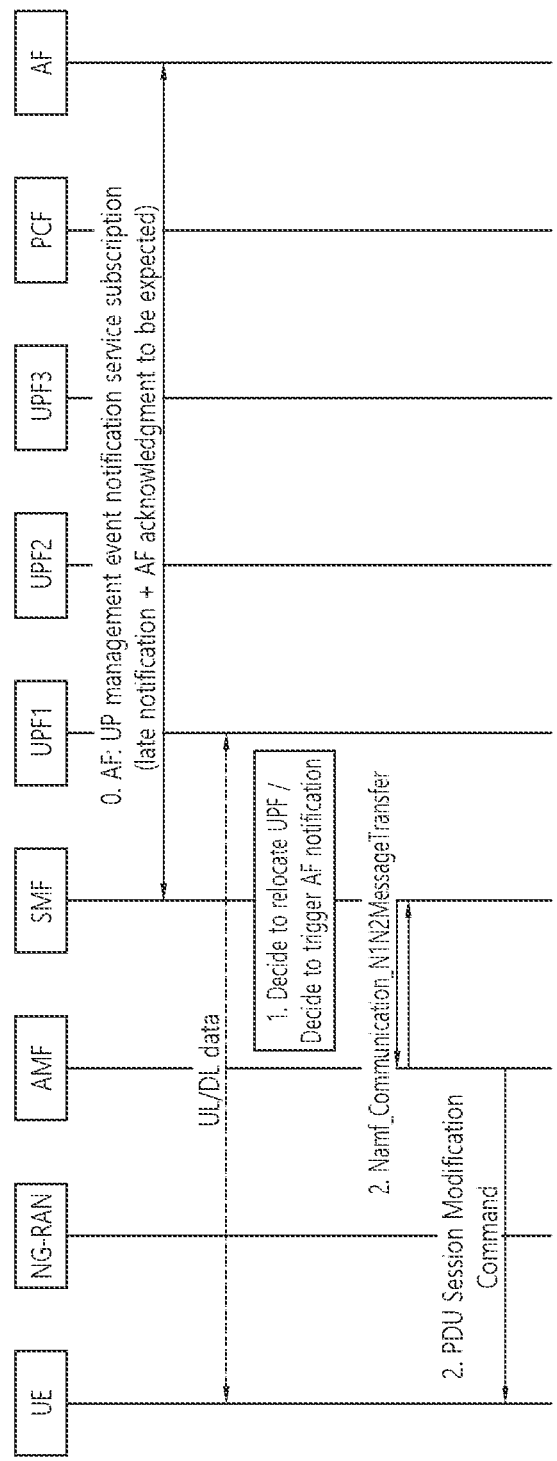
FIGS. 13a and 13b show a procedure for late notification in SSC mode 3 according to a second implementation example.
Figure 13B:
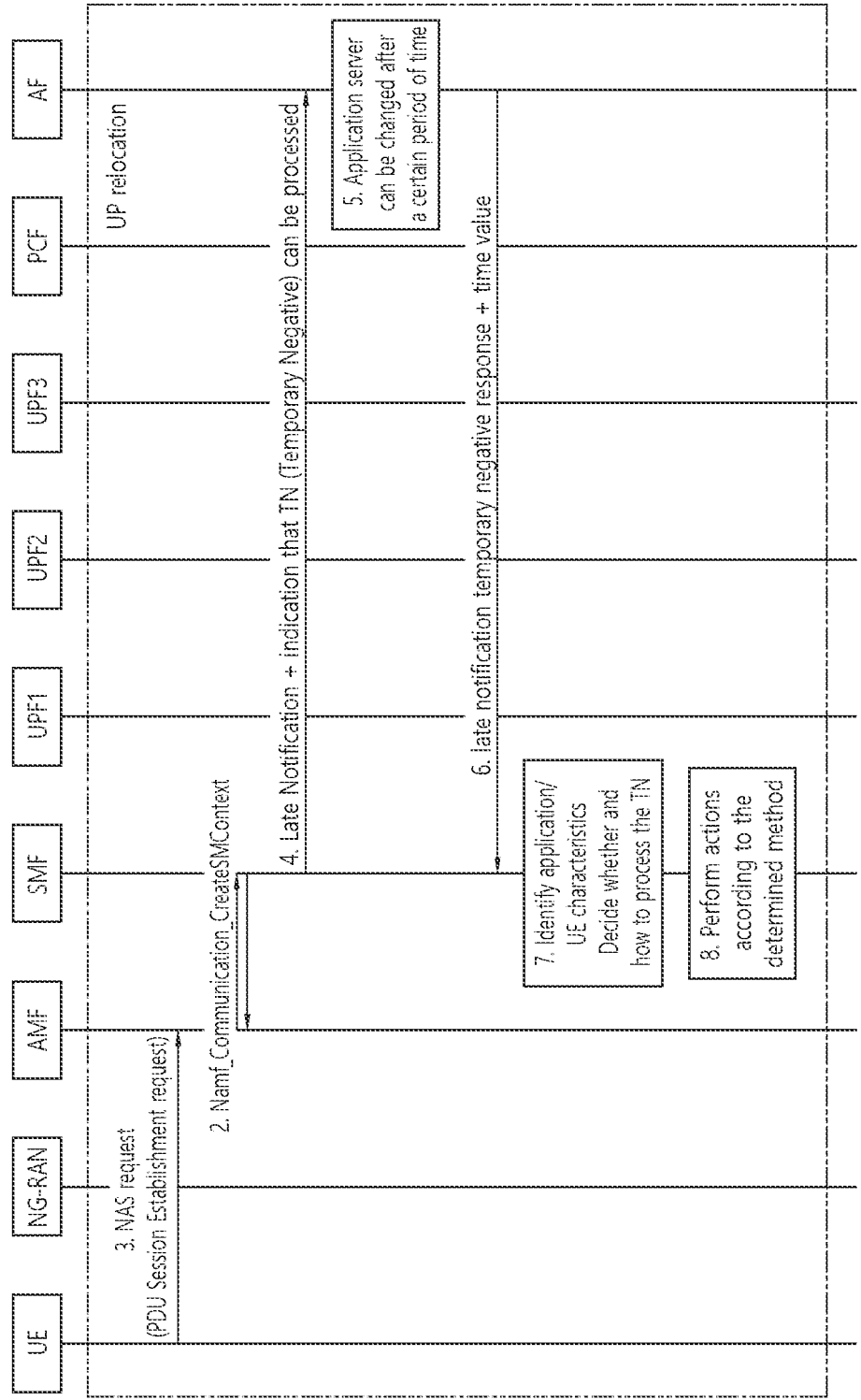

FIGS. 13*a* and 13*b* show a procedure for late notification in SSC mode 3 according to a second implementation example.

0) The AF subscribed to SMF's service for UP management event notification, and the UE is transmitting UL/DL data with the network via the UPF1.
1) The network determines whether to request the IP address of the application server and whether to transmit a notification to the AF based on the capability information of the UE, the location information of the UE obtained from the AMF, the corresponding session information, the service information subscribed by the AF in advance, the pre-configured policy, etc.
2) The SMF performs an operation for transmitting a PDU session modification command to the UE in order to perform a procedure for UP relocation. Additionally, the message transmitted by the SMF to the UE may include information that directly/indirectly informs the possibility of the application server change.
3) The UE initiates the PDU session establishment procedure to perform the procedure for UP relocation.
4) The SMF informs that it has the ability to process temporary negative responses with Late Notification.
5) The AF determines whether application relocation can be processed within a specific time, although immediate application relocation is not possible due to overload and sequential processing.
6) The AF transmits a temporary negative response to the SMF. This is for the purpose of expressing a will of the AF to perform application relocation. Additionally, the AF may transmit a time value informing how long after application relocation is possible.
7) Upon receiving a temporary negative response from the AF, the SMF identifies application characteristics and UE characteristics, and determines whether and how to process the temporary negative response.

The SMF identifies application characteristics and UE characteristics based on pre-configured local configuration (e.g., Identify application characteristics through DNN of PDU session, etc. Identify UE characteristics through information collected from other network function nodes such as NWDAF and AMF, etc.)

Due to the characteristics of applications and UE, when the speed is high like V2X so it is meaningless unless the relocation of the application is immediate, the SMF stops the corresponding procedure as in the case of receiving a negative response.

Due to the characteristics of applications and UE, when AR/VR games are played in a fixed place for a certain period of time, if the relocation of the application is meaningful even afterward for an efficient route, the SMF takes actions to wait for application relocation.

8) A subsequent procedure according to the determined method is performed.

For example, the transmission of the NAS message to the UE may be delayed by a specific time.

Specific time value information may be included in the NAS message to be transmitted to the UE (This is to notify the UE that the PDU session has been established, but the established PDU session will be activated after a certain time, or to extend the NAS transaction time).

Upon receiving this value, the UE transmits a PDU session request message and may perform an operation of modifying (extending) the NAS transaction time value waiting for a response.

The waiting time for a positive response from the AF may be extended (if no response is received for a certain period of time, it is assumed that a negative response has been received, so that the time for interaction with the AF is extended).

Figure 14A:
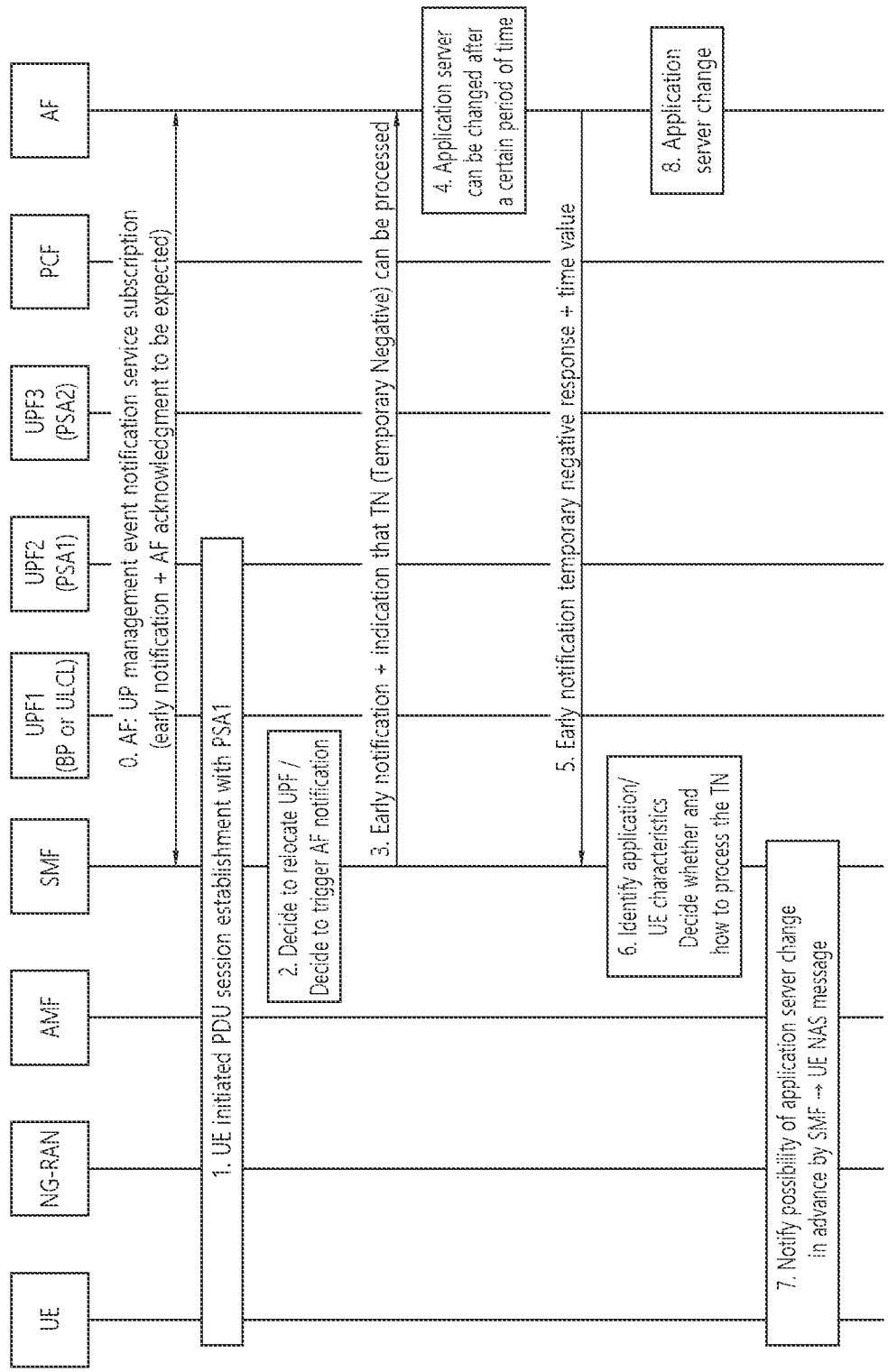
FIGS. 14a and 14b show an example for transmitting an early notification in a UL CL or Branching Point procedure according to a third implementation example.
Figure 14B:
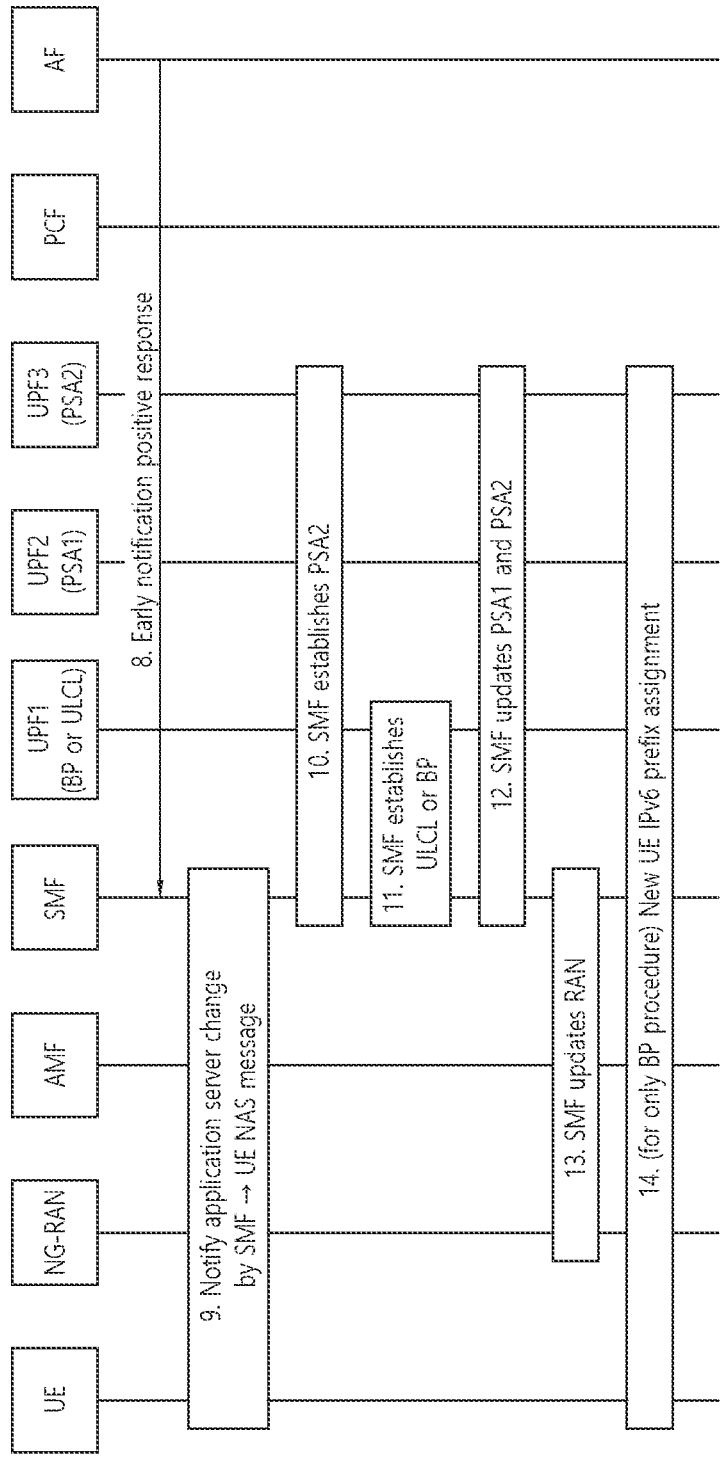

FIGS. 14a and 14b show an example for transmitting an early notification in a UL CL or Branching Point procedure according to a third implementation example.

0) The AF subscribed to SMF's service for UP management event notification.
1) The UE performs a PDU session establishment procedure for connection with the PSA1.
2) The network determines whether to process temporary negative responses and whether to transmit a notification to the AF based on the capability information of the UE, the location information of the UE obtained from the AMF, the corresponding session information, the service information subscribed by the AF in advance, the pre-configured policy, etc.
3) The SMF informs that it has the ability to process temporary negative responses with Early Notification.
4) The AF determines whether application relocation can be processed within a specific time, although immediate application relocation is not possible due to overload and sequential processing.
5) The AF transmits a temporary negative response to the SMF. This is for the purpose of expressing a will of the AF to perform application relocation. Additionally, the AF may transmit a time value informing how long after application relocation is possible.
6) Upon receiving a temporary negative response from the AF, the SMF identifies application characteristics and UE characteristics, and determines whether and how to process the temporary negative response.
7) The SMF may directly/indirectly deliver information that the application server change is likely to occur in the future to the UE via the AMF.
8) Upon transmitting the temporary negative response, the AF transmits the successful result of the relocation to the SMF after performing the successful application relocation.
9) The SMF may directly/indirectly deliver information that the application server has changed to the UE via the AMF.
10) The SMF performs a procedure for UP relocation, and in the example of FIGS. 14a and 14b, a PSA2 node is configured.
11) The SMF performs a procedure for UP relocation, and in the examples of FIGS. 14a and 14b, UL CL or a Branching Point node is configured.
12) The SMF performs a procedure for UP relocation, and in the examples of FIGS. 14a and 14b, the configurations of the PSA1 and the PSA2 are updated.
13) The SMF performs a procedure for UP relocation, and in the examples of FIGS. 14a and 14b, the configuration of the base station is updated.
14) The SMF performs a procedure for UP relocation, and in the examples of FIGS. 14a and 14b, the network transmits an IPv6 prefix to additionally allocate a new IPv6 address to the UE.

Figure 15B:
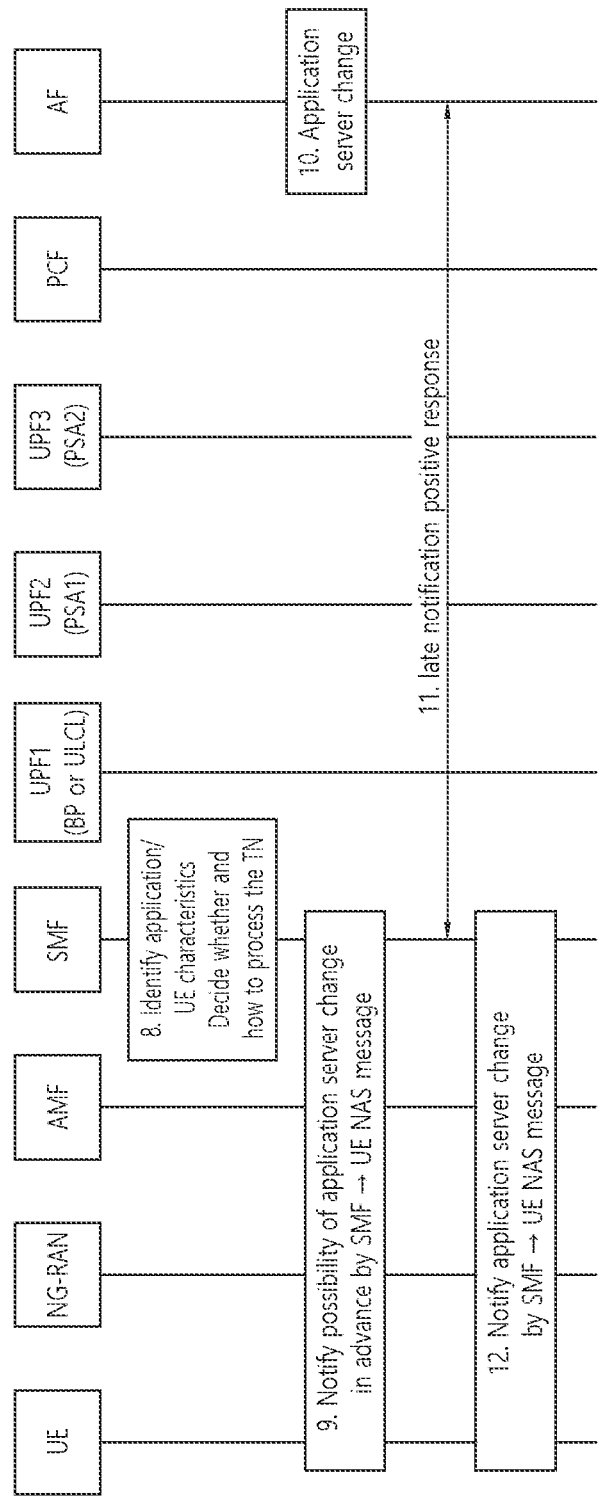

FIGS. 15a and 15b show an example for transmitting a late notification in a UL CL procedure according to a fourth implementation example.

0) The AF subscribed to SMF's service for UP management event notification.
1) The UE performs a PDU session establishment procedure for connection with the PSA1.
2) The network determines whether to process temporary negative responses and whether to transmit a notification to the AF based on the capability information of the UE, the location information of the UE obtained from the AMF, the corresponding session information, the service information subscribed by the AF in advance, the pre-configured policy, etc.
3) The SMF performs a procedure for UP relocation, and in the example of FIGS. 15a and 15b, a PSA2 node is configured.
4) The SMF performs a procedure for UP relocation, and in the examples of FIGS. 15a and 15b, UL CL node is configured.
5) The SMF informs that it has the ability to process temporary negative responses with Late Notification.
6) The AF determines whether application relocation can be processed within a specific time, although immediate application relocation is not possible due to overload and sequential processing.
7) The AF transmits a temporary negative response to the SMF. This is for the purpose of expressing a will of the AF to perform application relocation. Additionally, the AF may transmit a time value informing how long after application relocation is possible.
8) Upon receiving a temporary negative response from the AF, the SMF identifies application characteristics and UE characteristics, and determines whether and how to process the temporary negative response.
9) The SMF may directly/indirectly deliver information that the application server change is likely to occur in the future to the UE via the AMF.
10) Upon transmitting the temporary negative response, the AF transmits the successful result of the relocation to the SMF after performing the successful application relocation.
11) The SMF may directly/indirectly deliver information that the application server has changed to the UE via the AMF.

Figure 16A:
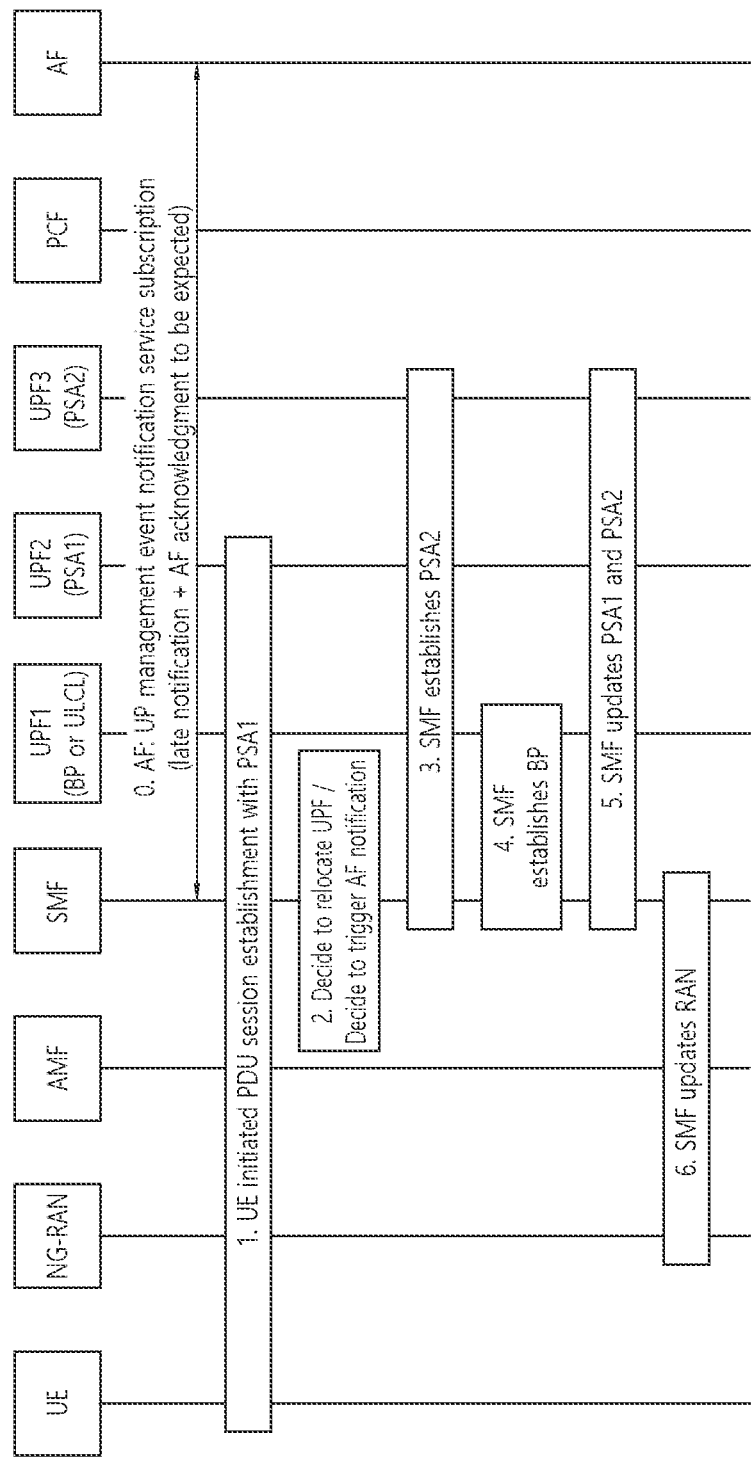
FIGS. 16a and 16b show an example for transmitting a late notification in a Branching Point procedure according to a fifth implementation example.
Figure 16B:
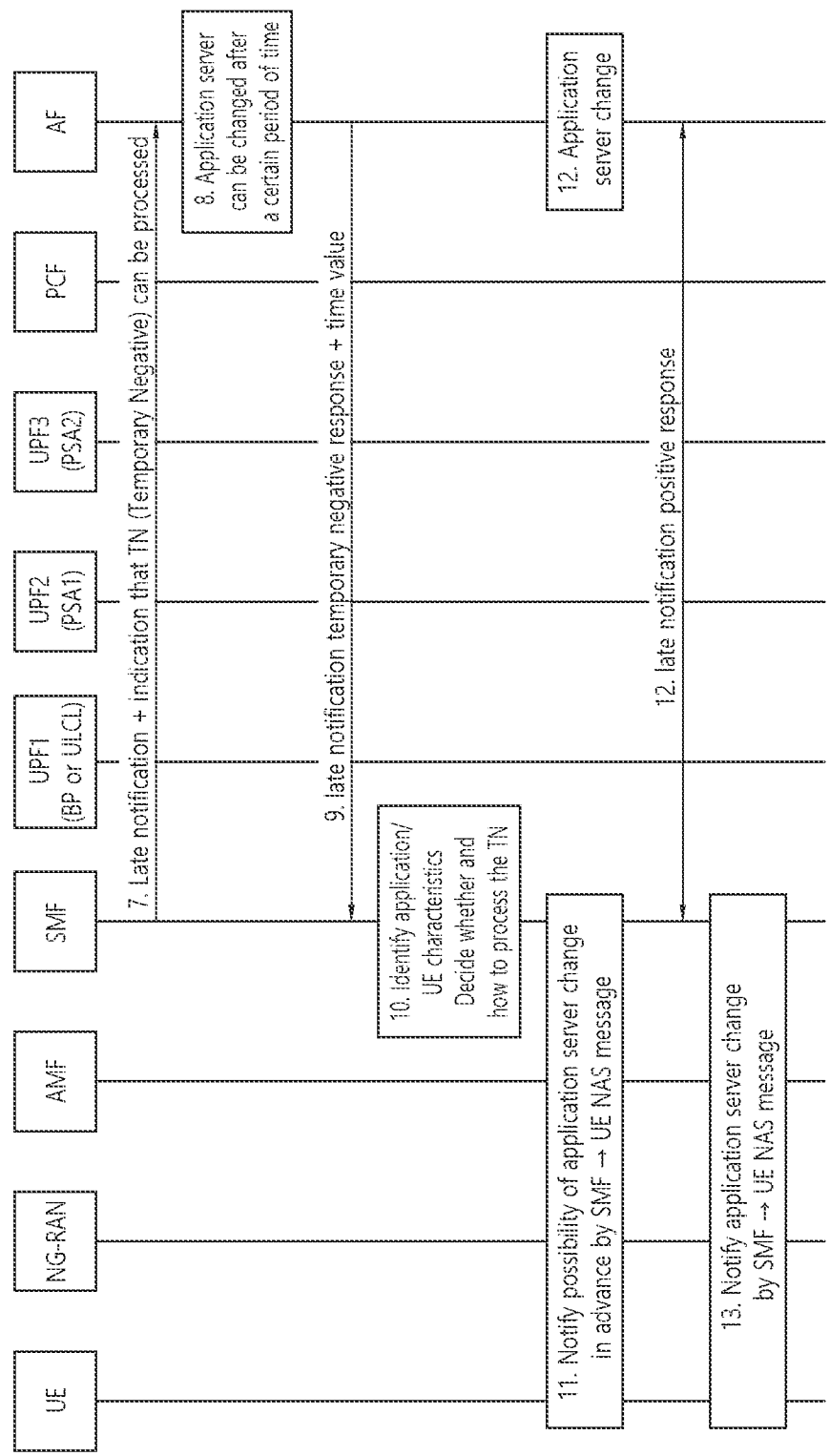

FIGS. 16a and 16b show an example for transmitting a late notification in a Branching Point procedure according to a fifth implementation example.
0) The AF subscribed to SMF's service for UP management event notification.
1) The UE performs a PDU session establishment procedure for connection with the PSA1.
2) The network determines whether to process temporary negative responses and whether to transmit a notification to the AF based on the capability information of the UE, the location information of the UE obtained from the AMF, the corresponding session information, the service information subscribed by the AF in advance, the pre-configured policy, etc.
3) The SMF performs a procedure for UP relocation, and in the example of FIGS. 16a and 16b, a PSA2 node is configured.
4) The SMF performs a procedure for UP relocation, and in the examples of FIGS. 16a and 16b, a BP node is configured.
5) The SMF performs a procedure for UP relocation, and in the examples of FIGS. 16a and 16b, the configurations of the PSA1 and the PSA2 are updated.
6) The SMF performs a procedure for UP relocation, and in the examples of FIGS. 16a and 16b, the configuration of the base station is updated.
7) The SMF informs that it has the ability to process temporary negative responses with Late Notification.
8) The AF determines whether application relocation can be processed within a specific time, although immediate application relocation is not possible due to overload and sequential processing.
9) The AF transmits a temporary negative response to the SMF. This is for the purpose of expressing a will of the AF to perform application relocation. Additionally, the AF may transmit a time value informing how long after application relocation is possible.
10) Upon receiving a temporary negative response from the AF, the SMF identifies application characteristics and UE characteristics, and determines whether and how to process the temporary negative response.
11) The SMF may directly/indirectly deliver information that the application server change is likely to occur in the future to the UE via the AMF.
12) Upon transmitting the temporary negative response, the AF transmits the successful result of the relocation to the SMF after performing the successful application relocation.
13) The SMF may directly/indirectly deliver information that the application server has changed to the UE via the AMF.

<General Examples to which the Disclosure of the Present Specification can be Applied>

Hereinafter, a device to which the above disclosure of the present specification can be applied will be described.

Figure 17:
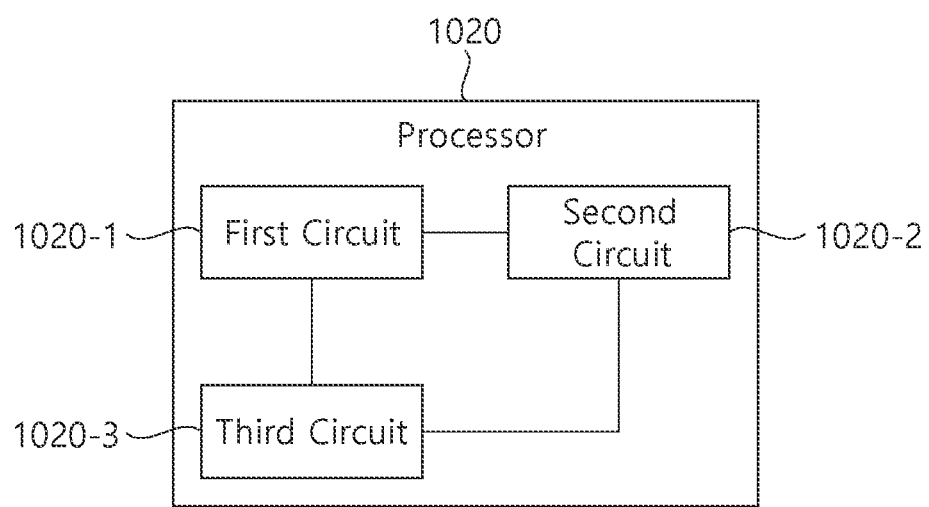
FIG. 17 shows a block diagram of a processor in which the disclosure of the present specification is implemented.

FIG. 17 shows a block diagram of a processor in which the disclosure of the present specification is implemented.

As can be seen with reference to FIG. 17, a processor 1020 in which the disclosure of the present specification is implemented may include a plurality of circuitry to implement the proposed functions, procedures and/or methods described in the present specification. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and may include at least one of a Digital Signal Processor (DSP), a Central Processing Unit (CPU), and a Graphics Processing Unit (GPU).

The processor 1020 may be included in a User Equipment (UE), an Application Function (AF) node, or a Session Management Function (SMF) node.

First, an example in which the processor 1020 is included in the UE will be described.

A device for a User Equipment (UE) may include at least one processor; and at least one memory for storing instructions and operably electrically connectable to the at least one processor. The instructions, based on being executed by the at least one processor, may perform operations comprising: receiving, from a Session Management Function (SMF) node, a message including information informing that change of an application server has occurred or is expected to occur; based on reception of the message, driving a timer for a remaining time until the change of the application server; and updating a Protocol Data Unit (PDU) session to an active state upon expiry of the timer.

The message may be Protocol Data Unit (PDU) session modification command message.

The message may include information on the remaining time until the change of the application server, based on that the change of the application server is expected to occur.

The operations may further include extending the timer.

Next, an example in which the processor 1020 is included in a device for an AF node will be described.

A device for an Application Function (AF) node may include at least one processor; and at least one memory for storing instructions and operably electrically connectable to the at least one processor. The instructions, based on being executed by the at least one processor, may perform operations comprising: receiving, from a Session Management Function (SMF) node, a notification message for a User Plane (UP) related event; and based on inability to immediately process a subsequent operation according to the notification message, transmitting, to the SMF node, a message including a temporary negative response. Based on transmission of the message including the temporary negative response, a negative response may not be transmitted. The notification message may include information informing a change of a UP path.

The subsequent operation may include an operation of a relocation of an application server, in response to the change of the UP path.

The notification message may include at least one of an Early Notification message and/or a Late Notification message.

The inability to immediately process the subsequent operation may include at least one of a congestion, an overload, and a processing delay according to a priority.

The operations may further include transmitting a message for requesting subscription to a notification service of the SMF node for the UP related event. The message for requesting the subscription may include information informing that the SMF node should wait for reception of the message for requesting the subscription from the AF node after transmitting the notification message.

The message including the temporary negative response may include a time value informing how much time after which the relocation of the application server is possible.

The at least one processor may include a first circuitry for processing receiving the notification message; and a second circuitry for processing transmitting, to the SMF node, the message including the temporary negative response.

Next, an example in which the processor 1020 is included in a device for an SMF node will be described.

A device for a Session Management Function (SMF) node may include at least one processor; and at least one memory for storing instructions and operably electrically connectable to the at least one processor. The instructions, based on being executed by the at least one processor, may perform operations comprising: transmitting, to an Application Function (AF) node, a notification message for a User Plane (UP) related event; and receiving, from the AF node, a message including a temporary negative response. The temporary negative response may be received based on inability for the AF node to immediately process a subsequent operation according to the notification message. Based on transmission of the message including the temporary negative response, a negative response may not be transmitted. The notification message may include information informing a change of a UP path.

Figure 18:
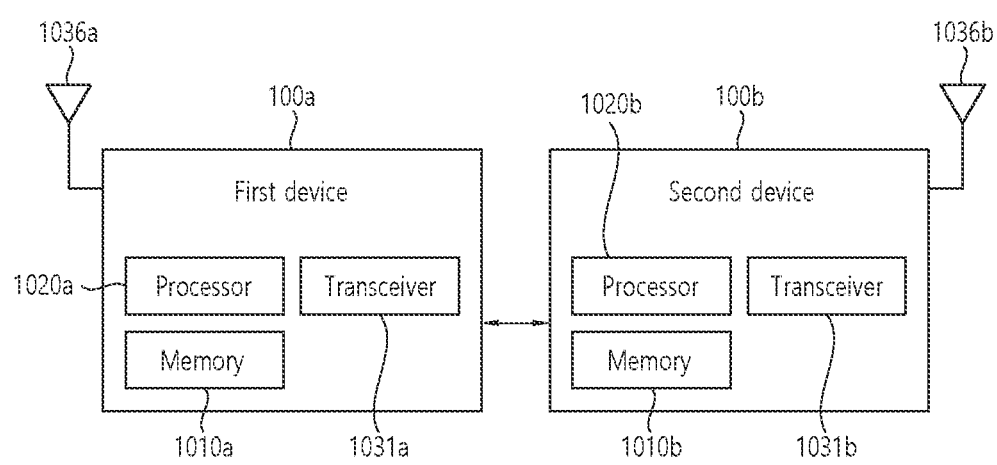
FIG. 18 illustrates a wireless communication system according to an embodiment.

FIG. 18 illustrates a wireless communication system according to an embodiment.

Referring to FIG. 18, the wireless communication system may include a first device 100*a* and a second device 100*b*.

The first device 100*a* may be a UE described in the disclosure of the present specification. Or, the first device 100*a* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a network node (e.g., AMF or MME) described in the disclosure of the present specification. Or, the second device 100*b* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease.

For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100*a* may include at least one processor such as a processor 1020*a*, at least one memory such as memory 1010*a*, and at least one transceiver such as a transceiver 1031*a*. The processor 1020*a* may perform the above-described functions, procedures, and/or methods. The processor 1020*a* may perform one or more protocols. For example, the processor 1020*a* may perform one or more layers of a radio interface protocol. The memory 1010*a* is connected to the processor 1020*a*, and may store various forms of information and/or instructions. The transceiver 1031*a* is connected to the processor 1020*a*, and may be controlled to transmit and receive radio signals.

The second device 100*b* may include at least one processor such as a processor 1020*b*, at least one memory device such as memory 1010*b*, and at least one transceiver such as a transceiver 1031*b*. The processor 1020*b* may perform the above-described functions, procedures and/or methods. The processor 1020*b* may implement one or more protocols. For example, the processor 1020*b* may implement one or more layers of a radio interface protocol. The memory 1010*b* is connected to the processor 1020*b*, and may store various forms of information and/or instructions. The transceiver 1031*b* is connected to the processor 1020*b* and may be controlled transmit and receive radio signals.

The memory 1010*a* and/or the memory 1010*b* may be connected inside or outside the processor 1020*a* and/or the processor 1020*b*, respectively, and may be connected to another processor through various technologies, such as a wired or wireless connection.

The first device 100*a* and/or the second device 100*b* may have one or more antennas.

For example, an antenna 1036*a* and/or an antenna 1036*b* may be configured to transmit and receive radio signals.

Figure 19:
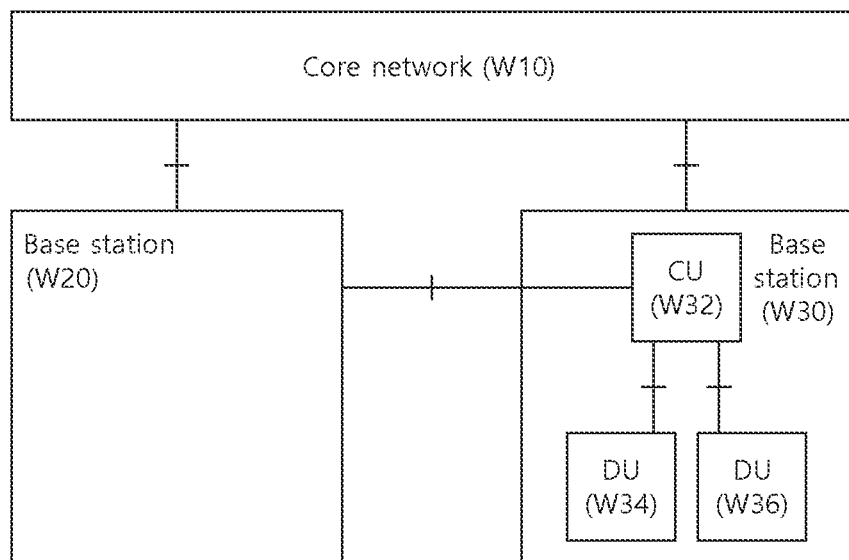
FIG. 19 illustrates a block diagram of a network node according to an embodiment.

FIG. 19 illustrates a block diagram of a network node according to an embodiment.

In particular, FIG. 19 is a diagram illustrating the network node of FIG. 18 in more detail when a base station is divided into a Central Unit (CU) and a Distributed Unit (DU).

Referring to FIG. 19, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Orotocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 20:
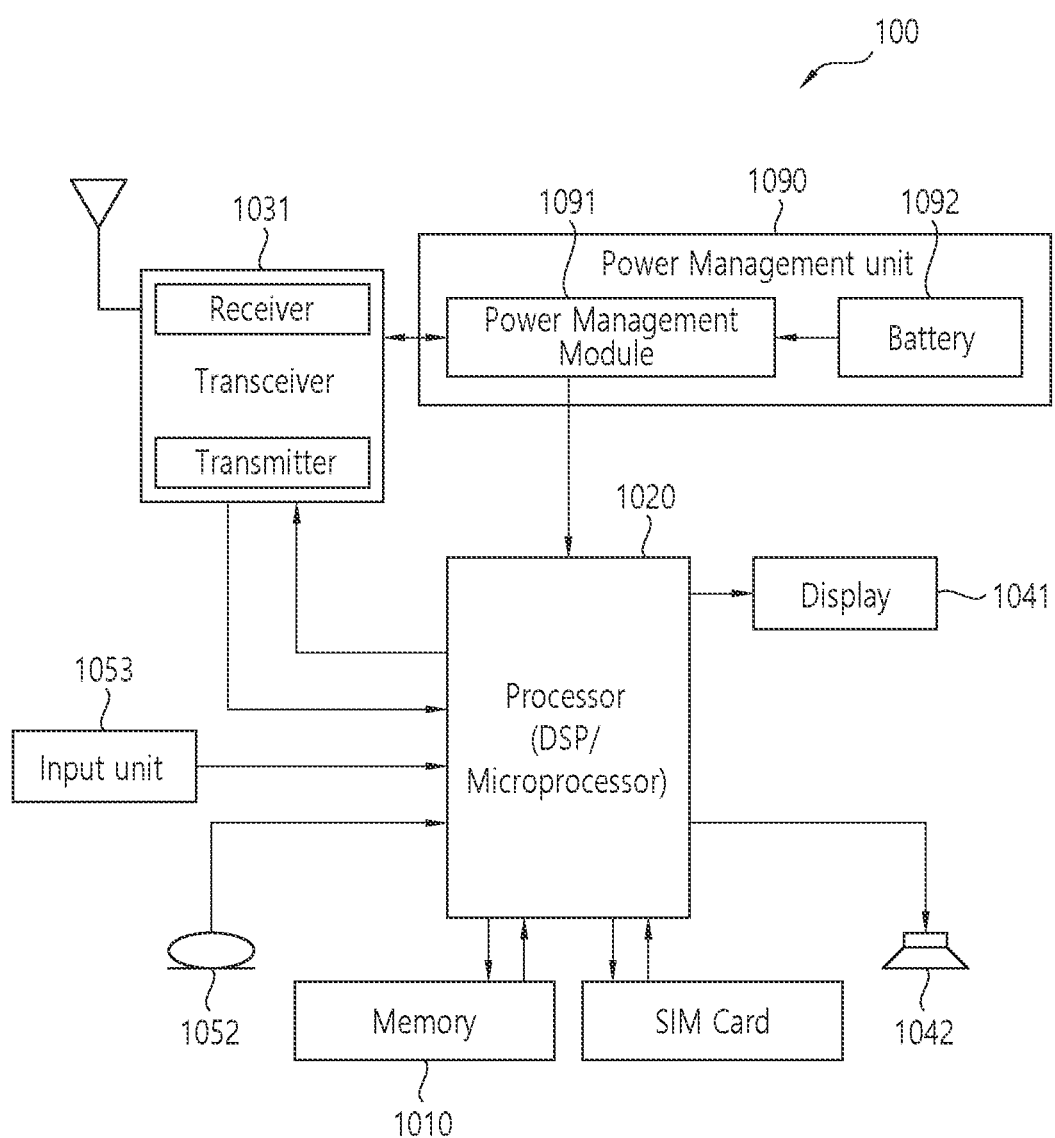
FIG. 20 is a block diagram illustrating a configuration of a UE according to an embodiment.

FIG. 20 is a block diagram illustrating a configuration of a UE according to an embodiment.

In particular, FIG. 20 is a diagram illustrating the UE of FIG. 18 above in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

<Scenarios to which the Disclosure of the Present Specification is Applicable>

Hereinafter, scenarios to which the present disclosure is applicable are described.

In the present specification, an always-on PDU session for URLLC having a low-latency characteristic may be used for artificial intelligence, robots, autonomous driving, extended reality, and the like among the 5G scenarios below.

Figure 21:
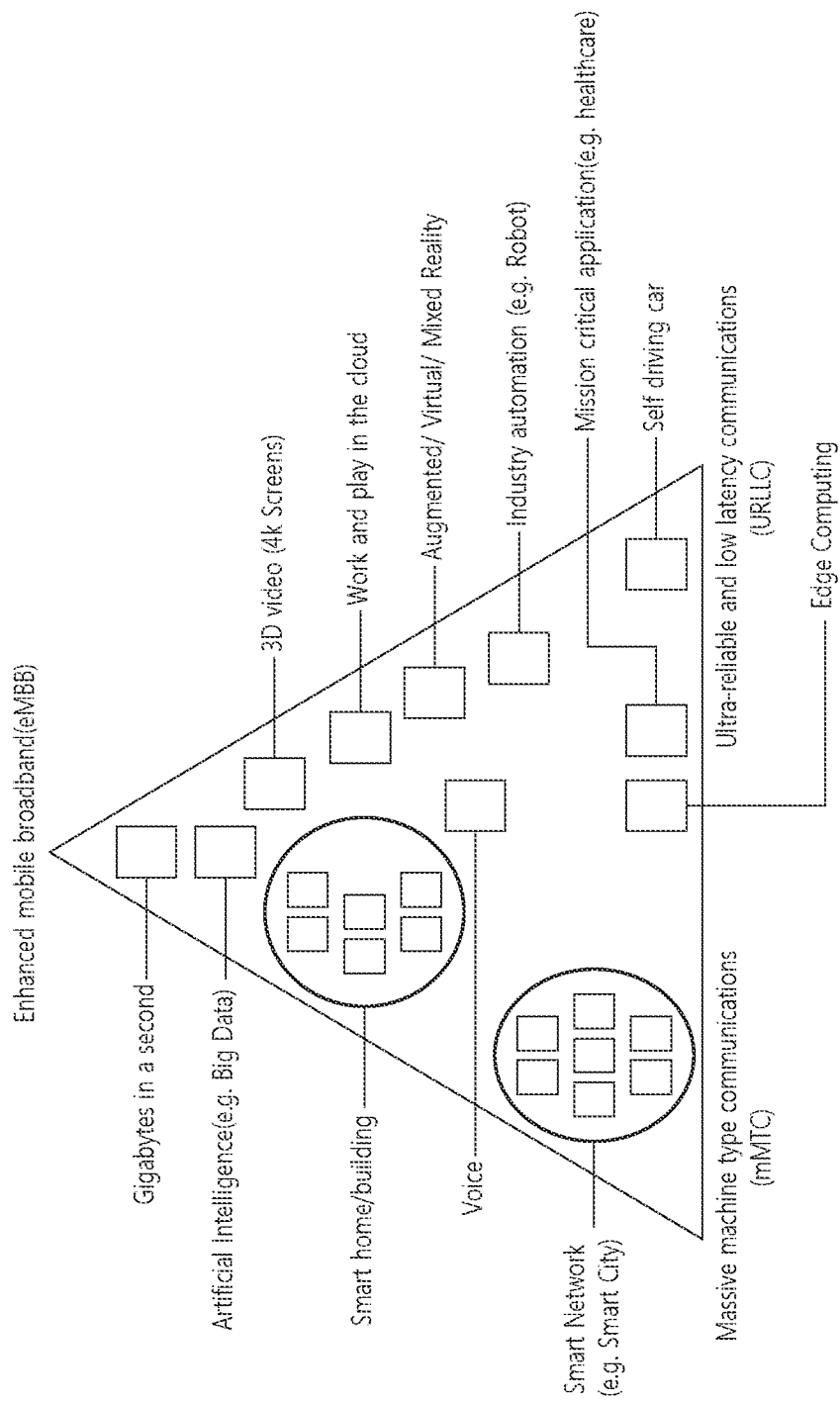
FIG. 21 illustrates an example of 5G use scenarios.

FIG. 21 illustrates an example of 5G use scenarios.

The 5G usage scenarios illustrated in FIG. 21 are merely exemplary, and the technical features of the present specification may also be applied to other 5G usage scenarios.

Referring to FIG. 21, three major requirement areas of 5G include: (1) an enhanced Mobile Broadband (eMBB) area, (2) a massive Machine Type Communication (mMTC) area, and (3) an Ultra-Reliable and Low Latency Communications (URLLC) area. Some examples of usage may require multiple areas for optimization, while other examples of usage may focus only on one Key Performance Indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video and mobile Internet connections will become more prevalent as more devices are connected to the Internet. Many of these applications require always-on connectivity to push real-time information and notifications to users. Cloud storage and applications are rapidly increasing in mobile communication platforms, which may be applied to both work and entertainment. Cloud storage is a special use case that drives the growth of uplink data rates. 5G is also used for remote work in the cloud and requires much lower end-to-end latency to maintain a good user experience when tactile interfaces are used. In entertainment, for example, cloud gaming and video streaming are another key factor requiring improvement in mobile broadband capabilities. Entertainment is essential on smartphones and tablets anywhere, including in highly mobile environments such as trains, cars and airplanes. Another use case is augmented reality and information retrieval for entertainment. Here, augmented reality requires very low latency and an instantaneous data amount.

The mMTC, which is designed to enable communication between a large number of low-cost devices powered by batteries, is provided to support smart metering, logistics, fields, and applications such as body sensors. The mMTC aims at about 10-year batteries and/or about one million devices per $km^2$. The mMTC enables seamless connection of embedded sensors in all fields to form a sensor network and is one of the most anticipated 5G use cases. Potentially, IoT devices are predicted to reach 20.4 billion by 2020. Smart networks utilizing industrial IoT is one of the areas where 5G plays a key role in enabling smart cities, asset tracking, smart utilities, agriculture and security infrastructure.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 18 will be described in more detail.

5G, which is a means of providing streams that are rated as hundreds of megabits per second to a gigabit per second, may complement Fiber-To-The-Home (FTTH) and cable-based broadband (or Data Over Cable Service Interface Specifications (DOCSIS)). Such a high speed may be required to deliver TVs with resolution of 4K or higher (6K, 8K and higher) as well as Virtual Reality (VR) and Augmented Reality (AR). VR and AR applications involve almost immersive sports events. Specific applications may require special network configuration. For example, in the case of VR games, a game company may need to integrate a core server with an edge network server of a network operator to minimize latency.

Automotive is expected to be an important new driver for 5G together with many use cases for mobile communication regarding vehicles. For example, entertainment for passengers require both high capacity and high mobile broadband. The reason is because future users will continue to expect high-quality connections, regardless of their location and speed. Another use case in the automotive sector is an augmented reality dashboard. The augmented reality dashboard allows drivers to identify objects in the dark on top of what they see through a front window. The augmented reality dashboard superimposes information to be provided to the driver regarding a distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding the driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities and drivers will be forced to focus only on traffic anomalies that the vehicle itself cannot identify. The technical requirements of autonomous vehicles require ultra-low latency and ultra-fast reliability to increase traffic safety to levels that cannot be achieved by humans.

Smart cities and smart homes referred to as smart society will be embedded with high-density wireless sensor networks as an example of smart networks. A distributed network of intelligent sensors will identify the conditions for cost and energy efficient maintenance of a city or home. A similar setup may be done for each household. Temperature sensors, window and heating controllers, burglar alarms, and home appliances are all wirelessly connected. Many of these sensors typically require low data rates, low power, and low cost. However, for example, real-time HD video may be required in certain types of devices for surveillance.

The consumption and distribution of energy including heat or gas is highly decentralized, requiring automated control of distributed sensor networks. A smart grid interconnects these sensors using digital information and communication technologies to collect information and act accordingly. This information may include the behavior of suppliers and consumers, so that the smart grid may improve efficiency, reliability, economical efficiency, sustainability of production, and a distribution of fuels such as electricity in an automated manner. The smart grid may also be considered as another low-latency sensor network.

A health sector has many applications that may benefit from mobile communications. The communication system may support telemedicine providing clinical care from remote locations. This may help reduce barriers to distance and improve access to medical services that are not consistently available in remote rural areas. It is also used to save lives in critical care and emergencies. A wireless sensor network based on mobile communication may provide remote monitoring and sensors for parameters such as a heart rate and blood pressure.

Wireless and mobile communications are becoming increasingly important in industrial applications. Wiring is expensive to install and maintain. Thus, a possibility of replacing cables with reconfigurable wireless links is an attractive opportunity for many industries. However, achieving this requires that a wireless connection operates with a delay, reliability and capacity similar to those of a cable and requires simplified management. Low latency and very low error probability are new requirements that need to be connected to 5G.

Logistics and cargo tracking is an important use case for mobile communications that enables tracking of inventory and packages from anywhere using a location-based information system. Logistics and freight tracking use cases typically require low data rates but require a wide range and reliable location information.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

An Artificial Neural Network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value.

The ANN may include an input layer, an output layer, and optionally one or more hidden layers. Each layer includes one or more neurons, and the ANN may include neurons and synapses connecting neurons. In the ANN, each neuron may output a function value of an activation function for input signals input through a synapse, a weight, and a bias.

A model parameter means a parameter determined through learning, and includes the weight of the synaptic connection and the bias of the neuron. In addition, the hyperparameter refers to a parameter that should be set before learning in a machine learning algorithm, and includes a learning rate, the number of iterations, a mini-batch size, an initialization function, etc.

The purpose of learning the ANN can be seen as determining the model parameters that minimize the loss function. The loss function may be used as an index for determining optimal model parameters in the learning process of the ANN.

Machine learning can be classified into supervised learning, unsupervised learning, and reinforcement learning according to a learning method.

Supervised learning may refer to a method of training the ANN in a state where a label for training data. The label may refer a correct answer (or result value) that the ANN should infer when training data is input to the ANN. Unsupervised learning may refer to a method of training the ANN in a state where no labels are given for training data. Reinforcement learning may refer to a learning method in which an agent defined in a certain environment learns to select an action or sequence of actions that maximizes the cumulative reward in each state.

Among ANNs, machine learning implemented as a Deep Neural Network (DNN) including a plurality of hidden layers is also called deep learning, and deep learning is a part of machine learning. Hereinafter, machine learning is used in a sense including deep learning.

<Robot>

A robot may refer to a machine which automatically handles a given task by its own ability, or which operates autonomously. Particularly, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. In addition, a movable robot may include, for example, a wheel, a brake, and a propeller in the driving unit thereof, and through the driving unit, may thus be capable of traveling on the ground or flying in the air.

<Self-Driving or Autonomous-Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, when a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality; XR>

Extended reality collectively refers to Virtual Reality (VR), Augmented Reality (AR), and Mixed Reality (MR). The VR technology provides real world objects or backgrounds only in CG images, the AR technology provides virtual CG images together with real object images, and the MR technology is computer graphic technology for mixing and combining virtual objects with the real world.

The MR technology is similar to the AR technology in that both real and virtual objects are shown together. However, there is a difference in that a virtual object is used to complement a real object in the AR technology, whereas a virtual object and a real object are used in an equivalent nature in the MR technology.

The XR technology may be applied to a Head-Mount Display (HMD), a Head-Up Display (HUD), a mobile phone, a tablet PC, a laptop, a desktop, a TV, digital signage, etc. A device to which the XR technology is applied may be referred to as an XR device.

Figure 22:
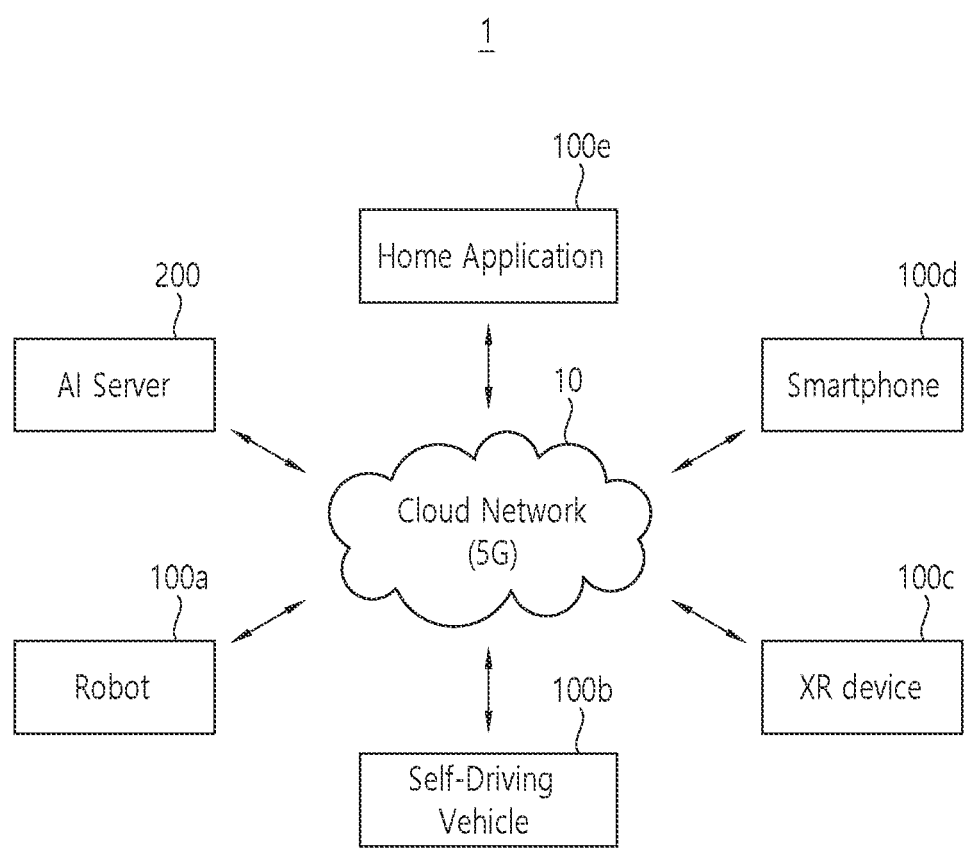
FIG. 22 shows an AI system 1 according to an embodiment.

FIG. 22 shows an AI system 1 according to an embodiment.

Referring to FIG. 22, an AI system 1 is connected to at least one of an AI server 200, a robot 100a, a self-driving vehicle 100b, an XR device 100c, a smartphone 100d, or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may be a network that constitutes a part of a cloud computing infrastructure or a network that exists in the cloud computing infrastructure. Here, the cloud network 10 may be configured using a 3G network, a 4G or LTE network, or a 5G network.

The devices 100a to 100e and 200 configuring the AI system 1 may be interconnected over the cloud network. Particularly, the devices 100a to 100e and 200 may communicate with each other through a base station but may directly communicate with each other without the intervention of a base station.

The AI server 200 may include a server that performs AI processing and a server that performs an operation on big data.

The AI server 200 is connected to at least one of the robot 100a, the self-driving vehicle 100b, the XR device 100c, the smartphone 100d or the home appliances 100e, that is, AI devices configuring the AI system, over the cloud network 10 and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model and may generate a response or control command based on the deduced result value.

Hereinafter, various embodiments of the AI devices 100a to 100e to which the aforementioned technology is applied will be described.

<AI+Robot>

The robot 100a, which adopts an AI technology, may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implemented with hardware.

The robot 100a may acquire status information of the robot 100a using sensor information acquired from various types of sensors, detect (recognize) surrounding environments and objects, generate map data, determine moving routes and driving plans, determine responses to user interactions, or determine actions.

Here, the robot 100a may use sensor information obtained from at least one sensor from among LIDAR, radar, and camera to determine a moving route and a driving plan.

The robot 100a may perform the above operations using a learning model including at least one artificial neural network. For example, the robot 100a may recognize a surrounding environment and an object using a learning model and may determine an operation using the recognized surrounding environment information or object information. Here, the learning model may be directly learned by the robot 100a or learned by an external device such as the AI server 200.

Here, the robot 100a may directly generate a result using a learning model and perform an operation, or transmit sensor information to an external device such as the AI server 200, receive a result generated accordingly, and perform an operation.

The robot 100a may determine a moving path and a driving plan using at least one of map data, object information detected from sensor information, or object information acquired from an external device, and control a driving unit to drive the robot 100a according to the moving path and the driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, a type, a distance, and a location.

In addition, the robot 100a may perform an operation or run by controlling the driving unit based on the user's control/interaction. In this case, the robot 100a may acquire interaction intention information according to a user's motion or voice speech, determine a response based on the acquired intention information, and perform an operation.

<AI+Autonomous-Driving/Self-Driving>

The autonomous vehicle 100b may be implemented as a mobile robot, a vehicle, an unmanned aerial vehicle, etc., to which AI technology is applied.

The autonomous vehicle 100b may include an autonomous driving control module for controlling the autonomous driving function, and the autonomous driving control module may refer to a software module and/or a chip implementing the software module. The autonomous driving control module may be included in the autonomous vehicle 100b as a component of the autonomous vehicle 100b, but may be connected to the outside of the autonomous vehicle 100b with separate hardware.

The autonomous vehicle 100b may acquire the state information of the autonomous vehicle 100b using the sensor information acquired from various kinds of sensors and/or detect (recognize) the surrounding environment and/or the object, and/or generate map data, and/or determine a travel route and/or a travel plan, and/or determine an operation.

Like the robot 100a, the autonomous vehicle 100b can use the sensor information acquired from at least one sensor among the LIDAR, the radar, and/or the camera to determine the travel route and/or the travel plan.

In particular, the autonomous vehicle 100b can recognize an environment and/or an object for an area in which the field of view is obscured and/or over a certain distance by receiving sensor information from external devices, and/or receive the recognized information directly from external devices.

The autonomous vehicle 100b can perform the above-described operations using a learning model composed of at least one ANN. For example, the autonomous vehicle 100b can recognize the surrounding environment and/or the object using the learning model, and can determine the travel route using the recognized surrounding information and/or the object information. The learning model may be learned directly from the autonomous vehicle 100b and/or learned from an external device such as the AI server 200.

In this case, the autonomous vehicle 100b may perform an operation by generating a result using a direct learning model, but the autonomous vehicle may also perform operation by transmitting sensor information to an external device such as the AI server 200 and receiving the generated result.

The autonomous vehicle 100b may determine the travel route and/or the travel plan using at least one of the map data, the object information detected from the sensor information and/or the object information acquired from the external device, and drive the autonomous vehicle 100b according to the determined travel route and/or travel plan by controlling the driving unit.

The map data may include object identification information on various objects arranged in a space (e.g. road) in which the autonomous vehicle 100b moves. For example, the map data may include object identification information on fixed objects such as street lamps, rocks, and buildings, and/or on movable objects such as vehicles and pedestrians. The object identification information may include a name, a type, a distance, and/or a position, etc.

Also, the autonomous vehicle 100b may perform the operation and/or run by controlling the driving unit based on the control/interaction of the user. The autonomous vehicle 100b may acquire the intention information of the interaction due to the user's operation and/or voice utterance, determine the response based on the acquired intention information, and perform the operation.

<AI+XR>

The XR device 100c may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 100c analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 100c may output an XR object, which includes the additional information about the recognized object, by corresponding to the recognized object.

The XR device 100c can perform the above-described operations using a learning model composed of at least one ANN. For example, the XR device 100c can recognize a real object from three-dimensional point cloud data and/or image data using the learning model, and can provide information corresponding to the recognized real object. The learning model may be learned directly from the XR device 100c and/or learned from an external device such as the AI server 1200.

In this case, the XR device 100c may perform an operation by generating a result using a direct learning model, but the autonomous vehicle may also perform operation by transmitting sensor information to an external device such as the AI server 200 and receiving the generated result.

<AI+Robot+Autonomous-Driving/Self-Driving>

The robot 100a may be implemented as a guide robot, a carrying robot, a cleaning robot, a wearable robot, an entertainment robot, a pet robot, an unmanned flying robot, etc., to which AI technology and autonomous-driving technology are applied.

The robot 100a, to which the AI technology and the autonomous-driving technology are applied, may mean the robot 100a having the autonomous-driving function itself and/or the robot 100a interacting with the autonomous vehicle 100b.

The robot 100a having an autonomous-driving function can collectively refer to devices that move by themselves in accordance with a given travel route and/or move by determining the traveling route by themselves without user's control.

The robot 100a having the autonomous-driving function and the autonomous vehicle 100b can use a common sensing method to determine at least one of the travel route and/or the travel plan. For example, the robot 100a having the autonomous-driving function and the autonomous vehicle 100b can determine at least one of the travel route and/or the travel plan using the information sensed through the LIDAR, the radar, and/or the camera.

The robot 100a interacting with the autonomous vehicle 100b may exist separately from the autonomous vehicle 100b, and the robot 100a interacting with the autonomous vehicle 100b may be associated with the autonomous-driving function inside and/or outside the autonomous vehicle 100, and/or may perform an operation associated with the user aboard the autonomous vehicle 100b.

The robot 100a interacting with the autonomous vehicle 100b may acquire the sensor information on behalf of the autonomous vehicle 100b and provide it to the autonomous vehicle 100b, or the robot 100a interacting with the autonomous vehicle 100b may obtain the sensor information and generate the environment information and/or the object information to provide the autonomous vehicle 100b, thereby controlling and/or assisting the autonomous-driving function of the autonomous vehicle 100b.

Or, the robot 100a interacting with the autonomous vehicle 100b may monitor the user boarding the autonomous vehicle 100b and/or may control the functions of the autonomous vehicle 100b through interaction with the user. For example, when it is determined that the driver is in a drowsy state, the robot 100a may activate the autonomous-driving function of the autonomous vehicle 100b and/or assist the control of the driving unit of the autonomous vehicle 100b. The function of the autonomous vehicle 100b controlled by the robot 100a may include not only an autonomous-driving function but also a function provided by a navigation system and/or an audio system provided in the autonomous vehicle 100b.

Or, the robot 100a interacting with the autonomous vehicle 100b may provide information and/or assist the function to the autonomous vehicle 100b outside the autonomous vehicle 100b. For example, the robot 100a, such as a smart traffic light, may provide traffic information including signal information, etc., to the autonomous vehicle 100b. The robot 100a, such as an automatic electric charger of an electric vehicle, may interact with the autonomous vehicle 100b to connect the electric charger to the charging hole automatically.

<AI+Robot+XR>

The robot 100a may be implemented as a guide robot, a carrying robot, a cleaning robot, a wearable robot, an entertainment robot, a pet robot, an unmanned flying robot, a drone, etc., to which AI technology and XR technology are applied.

The robot 100a to which the XR technology is applied may refer to a robot that is subject to control/interaction in the XR image. In this case, the robot 100a may be separated from the XR device 100c and can be associated with each other.

When the robot 100a that is the subject to control/interaction in the XR image acquires the sensor information from the sensors including the camera, the robot 100a and/or the XR device 100c may generate an XR image based on the sensor information and the XR device 100c can output the generated XR image. The robot 100a can operate based on a control signal and/or a user's interaction input through the XR device 100c.

For example, the user can acknowledge the XR image corresponding to the viewpoint of the robot 100a remotely linked through the external device such as the XR device 100c, and can adjust the autonomous travel path of the robot 100a, control operation and/or driving, or check the information of neighboring objects, through interaction.

<AI+Autonomous-Driving/Self-Driving+XR>

The autonomous vehicle 100b may be implemented as a mobile robot, a vehicle, an unmanned aerial vehicle, etc., to which AI technology and XR technology are applied.

The autonomous driving vehicle 100b to which the XR technology is applied may mean an autonomous vehicle having means for providing an XR image and/or an autonomous vehicle that is subject to control/interaction in the XR image. Particularly, the autonomous vehicle 100b that is subject to control/interaction in the XR image may be separated from the XR device 100c and can be associated with each other.

The autonomous vehicle 100b having the means for providing the XR image can acquire the sensor information from the sensors including the camera and output the generated XR image based on the acquired sensor information. For example, the autonomous vehicle 100b may include an HUD to output an XR image, thereby providing a passenger with a real object and/or an XR object corresponding to an object in the screen.

At this time, when the XR object is output to the HUD, at least a part of the XR object may be output so as to overlap with the actual object that the passenger's gaze is directed to. On the other hand, when the XR object is output to the display provided in the autonomous vehicle 100b, at least a part of the XR object may be output so as to overlap with the object in the screen. For example, the autonomous vehicle 100b can output XR objects corresponding to objects such as a lane, another vehicle, a traffic light, a traffic sign, a two-wheeled vehicle, a pedestrian, a building, etc.

When the autonomous vehicle 100b that is the subject to control/interaction in the XR image acquires the sensor information from the sensors including the camera, the autonomous vehicle 100b and/or the XR device 100c may generate an XR image based on the sensor information and the XR device 100c can output the generated XR image. The autonomous vehicle 100b can operate based on a control signal and/or a user's interaction input through the XR device 100c.

In the above, preferred embodiments have been exemplarily described, but the disclosure of the present specification is not limited to such specific embodiments, and thus, it may be modified, changed, or improved in various forms within the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A device for a User Equipment (UE), the device comprising:
    at least one processor; and
    at least one memory for storing instructions and operably electrically connectable to the at least one processor,
    wherein the instructions, based on being executed by the at least one processor, cause the UE to perform operations comprising:
        establishing a session with a session management function;
        receiving, from the session management function, a message including i) information informing that change of an application server is expected to occur and ii) information related to a timer, wherein the information informing that the change of the application server is expected to occur is based on a temporary negative response transmitted from an application function to the session management function, and wherein the temporary negative response informs that the change of the application server is not immediate, but is certain within specific time;

determining that the change of the application server will be successful based on the information informing that the change of the application server is expected to occur; and managing the timer based on the information related to the timer, wherein managing the timer comprises:
i) updating or extending the timer related to the session, and
ii) updating the session to an active state upon expiry of the timer.

* * * * *